United States Patent
Koshi et al.

(10) Patent No.: US 6,728,447 B2
(45) Date of Patent: Apr. 27, 2004

(54) OPTICAL MULTIPLEXER/DEMULTIPLEXER

(75) Inventors: Hiroyuki Koshi, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 170 days.

(21) Appl. No.: 10/117,131

(22) Filed: Apr. 8, 2002

(65) Prior Publication Data

US 2003/0007734 A1 Jan. 9, 2003

(30) Foreign Application Priority Data

Apr. 11, 2001 (JP) .................................... 2001-112927
Jan. 24, 2002 (JP) .................................... 2002-015326

(51) Int. Cl.[7] ............................ G02B 6/26; G02B 6/293
(52) U.S. Cl. ............................ 385/42; 385/39; 385/24; 385/15; 385/14; 398/79; 398/82
(58) Field of Search ................................ 385/15, 24, 39, 385/42, 46, 14; 398/FOR 118, 82, 79

(56) References Cited

U.S. PATENT DOCUMENTS

| | | | | |
|---|---|---|---|---|
| 5,044,715 A | * | 9/1991 | Kawachi et al. | 385/42 |
| 5,119,453 A | * | 6/1992 | Gonthier et al. | 385/43 |
| 5,418,868 A | * | 5/1995 | Cohen et al. | 385/16 |
| 5,933,554 A | * | 8/1999 | Leuthold et al. | 385/28 |

FOREIGN PATENT DOCUMENTS

| | | |
|---|---|---|
| JP | 61-08019 | 4/1988 |
| JP | 02-157711 | 6/1990 |

OTHER PUBLICATIONS

H. Toba, et al., Electronics Letters, vol. 23, No. 15, pp. 788–789, "5 GHz–Spaced, Eight–Channel, Guided–Wave Tunable Multi/Demultiplexer for Optical FDM Transmission Systems", Jul. 16, 1987.

K. Inoue, et al., Journal of Lightwave Technology, vol. 6, No. 2, pp. 339–345, "A Four–Channel Optical Waveguide Multi/Demultiplexer for 5–GHz Spaced Optical FDM Transmission", Feb. 1988.

N. Takato, et al., Journal of Lightwave Technology, vol. 6, No. 6, pp. 1003–1010, "Silica–Based Single–Mode Waveguides on Silicon and Their Application to Guided–Wave Optical Interferometers", Jun. 1988.

B. H. Verbeek, et al., Journal of Lightwave Technology, vol. 6, No. 6, pp. 1011–1015, "Integrated Four–Channel Mach–Zehnder Multi/Demultiplexer Fabricated with Phosphorous Doped $SiO_2$ Waveguides on Si", Jun. 1988.

N. Takato, et al., ECOC '86, pp. 443–446, "Guided–Wave Multi/Demultiplexer for Optical FDM Transmission", 1986.

M. Kawachi, Optical and Quantum Electronics, vol. 22, pp. 391–416, "Silica Waveguides on Silicon and Their Application to Integrated–Optic Components", Sep. 1990.

* cited by examiner

Primary Examiner—Edward J. Glick
Assistant Examiner—Krystyna Suchecki
(74) Attorney, Agent, or Firm—Oblon, Spivak, McClelland, Maier & Neustadt, P.C.

(57) ABSTRACT

An optical multiplexer/demultiplexer includes first and second directional coupling portions in which first and second optical waveguides are provided to transfer a light between the first and second optical waveguides. Lengths of the first and second optical waveguides have a difference (ΔL). A product between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5. Power coupling ratio differences are at least approximately 1% and at most approximately 10%. Third power coupling ratios with respect to an average wavelength of the cross-propagation wavelength (λ2) and the through-propagation wavelength (λ1) are at least approximately 45% and at most approximately 55%.

16 Claims, 17 Drawing Sheets

OPTICAL MULTIPLEXER/DEMULTIPLEXER

CROSS-REFERENCE TO RELATED APPLICATIONS

The present application claims priority to Japanese Patent Application Nos. 2001-112927, filed Apr. 11, 2001, and 2002-015326, filed Jan. 24, 2002. The contents of those applications are incorporated herein by reference in their entirety.

BACKGROUND OF THE INVENTION

1. Field of the Invention

The present invention relates to an optical multiplexer/demultiplexer and an optical multiplexer/demultiplexer apparatus.

2. Discussion of the Background

Recent dramatic increase in internet traffic requires an increase in transmission network capacity. One of the solutions for this requirement is wavelength division multiplexing (WDM) technology. In the wavelength division multiplexing technology, a plurality of lights having wavelengths different from each other are multiplexed and are transmitted in one optical fiber. Accordingly, the transmission capacity may increases by the number of lights multiplexed.

In order to realize the wavelength division multiplexing system, optical device such as optical multiplexers/demultiplexers are required.

The optical multiplexer/demultiplexer multiplexes lights having wavelengths different from each other or demultiplexes a light to lights having different wavelengths. For example, a multiplexed light multiplexed by an optical multiplexer/demultiplexer is transmitted to an optical fiber. Further, the multiplexed light transmitted in the optical fiber is demultiplexed by an optical multiplexer/demultiplexer and lights having different wavelengths are output.

Such optical multiplexer/demultiplexer is, for example, an arrayed waveguide grating (AWG), a Mach-Zehnder interferometer and the like.

Conventionally, the Mach-Zehnder Interferometer type optical multiplexer/demultiplexer may multiplex lights or demultiplex a light which has close wavelengths, for example, 1549 nm and 1551 nm.

SUMMARY OF THE INVENTION

According to one aspect of the present invention, an optical multiplexer/demultiplexer includes a first optical waveguide, a second optical waveguide, a first directional coupling portion in which the first and the second optical waveguides are provided to transfer a light between the first and second optical waveguides, and a second directional coupling portion in which the first and the second optical waveguides are provided to transfer a light between the first and second optical waveguides. The first and second directional coupling portions are provided such that a length of the first optical waveguide between the first and second directional coupling portions and a length of the second optical waveguide between the first and second directional coupling portion have a difference ($\Delta L$). A product ($n \times \Delta L$) between the difference ($\Delta L$) and a refractive index ($n$) of the first and second optical waveguides approximates a product between a cross-propagation wavelength ($\lambda 2$) and a value ($N'$) substantially equal to an integer ($N$), and a product between a through-propagation wavelength ($\lambda 1$) and the value ($N'$)±0.5. The cross-propagation wavelength ($\lambda 2$) is a wavelength of a cross-propagation light which propagates from the first optical waveguide to the second optical waveguide or from the second optical waveguide to the first optical waveguide. The through-propagation wavelength ($\lambda 1$) is a wavelength of a through-propagation light which propagates from an input to an output of the first optical waveguide or from an input to an output of the second optical waveguide. Power coupling ratio differences between first power coupling ratios of the first and second directional coupling portions with respect to the cross-propagation wavelength ($\lambda 2$) and second power coupling ratios of the first and second directional coupling portions with respect to the through-propagation wavelength ($\lambda 1$) are at least approximately 1% and at most approximately 10%. Third power coupling ratios of the first and second directional coupling portions with respect to an average wavelength of the cross-propagation wavelength ($\lambda 2$) and the through-propagation wavelength ($\lambda 1$) are at least approximately 45% and at most approximately 55%.

According to another aspect of the present invention, an optical multiplexer/demultiplexer includes a first optical waveguide, a second optical waveguide, a first multi-mode interferometer waveguide to which the first and second optical waveguides are connected, and a second multi-mode interferometer waveguide to which the first and second optical waveguides are connected. The first and second multi-mode interferometer waveguides are provided such that a length of the first optical waveguide between the first and second multi-mode interferometer waveguides and a length of the second optical waveguide between the first and second multi-mode interferometer waveguides have a difference ($\Delta L$). A product ($n \times \Delta L$) between the difference ($\Delta L$) and a refractive index ($n$) of the first and second optical waveguides approximates a product between a cross-propagation wavelength ($\lambda 2$) and a value ($N'$) substantially equal to an integer ($N$), and a product between a through-propagation wavelength ($\lambda 1$) and the value ($N'$)±0.5. The cross-propagation wavelength ($\lambda 2$) is a wavelength of a cross-propagation light which propagates from the first optical waveguide to the second optical waveguide or from the second optical waveguide to the first optical waveguide. The through-propagation wavelength ($\lambda 1$) is a wavelength of a through-propagation light which propagates from an input to an output of the first optical waveguide or from an input to an output of the second optical waveguide. Power coupling ratio differences between first power coupling ratios of the first and second multi-mode interferometer waveguides with respect to the cross-propagation wavelength ($\lambda 2$) and second power coupling ratios of the first and second multi-mode interferometer waveguides with respect to the through-propagation wavelength ($\lambda 1$) are at least approximately 1% and at most approximately 10%. Third power coupling ratios of the first and second multi-mode interferometer waveguides with respect to an average wavelength of the cross-propagation wavelength ($\lambda 2$) and the through-propagation wavelength ($\lambda 1$) are at least approximately 45% and at most approximately 55%.

According to yet another aspect of the present invention, an optical multiplexer/demultiplexer apparatus includes a plurality of optical multiplexers/demultiplexers provided to repeat multiplexing or demultiplexing. Each of the optical multiplexers/demultiplexers includes a first optical waveguide, a second optical waveguide, a first directional coupling portion in which the first and the second optical waveguides are provided to transfer a light between the first and second optical waveguides, and a second directional coupling portion in which the first and the second optical waveguides are provided to transfer a light between the first and second optical waveguides. The first and second directional coupling portions are provided such that a length of the first optical waveguide between the first and second directional coupling portions and a length of the second optical waveguide between the first and second directional coupling portion have a difference (ΔL). A product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5. The cross-propagation wavelength (λ2) is a wavelength of a cross-propagation light which propagates from the first optical waveguide to the second optical waveguide or from the second optical waveguide to the first optical waveguide. The through-propagation wavelength (λ1) is a wavelength of a through-propagation light which propagates from an input to an output of the first optical waveguide or from an input to an output of the second optical waveguide. Power coupling ratio differences between first power coupling ratios of the first and second directional coupling portions with respect to the cross-propagation wavelength (λ2) and second power coupling ratios of the first and second directional coupling portions with respect to the through-propagation wavelength (λ1) are at least approximately 1% and at most approximately 10%. Third power coupling ratios of the first and second directional coupling portions with respect to an average wavelength of the cross-propagation wavelength (λ2) and the through-propagation wavelength (λ1) are at least approximately 45% and at most approximately 55%.

According to yet another aspect of the present invention, an optical multiplexer/demultiplexer apparatus includes a plurality of optical multiplexers/demultiplexers provided to repeat multiplexing or demultiplexing. Each of the optical multiplexers/demultiplexers includes a first optical waveguide, a second optical waveguide, a first multi-mode interferometer waveguide to which the first and second optical waveguides are connected, and a second multi-mode interferometer waveguide to which the first and second optical waveguides are connected. The first and second multi-mode interferometer waveguides are provided such that a length of the first optical waveguide between the first and second multi-mode interferometer waveguides and a length of the second optical waveguide between the first and second multi-mode interferometer waveguides have a difference (ΔL). A product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5. The cross-propagation wavelength (λ2) is a wavelength of a cross-propagation light which propagates from the first optical waveguide to the second optical waveguide or from the second optical waveguide to the first optical waveguide. The through-propagation wavelength (λ1) is a wavelength of a through-propagation light which propagates from an input to an output of the first optical waveguide or from an input to an output of the second optical waveguide. Power coupling ratio differences between first power coupling ratios of the first and second multi-mode interferometer waveguides with respect to the cross-propagation wavelength (λ2) and second power coupling ratios of the first and second multi-mode interferometer waveguides with respect to the through-propagation wavelength (λ1) are at least approximately 1% and at most approximately 10%. Third power coupling ratios of the first and second multi-mode interferometer waveguides with respect to an average wavelength of the cross-propagation wavelength (λ2) and the through-propagation wavelength (λ1) are at least approximately 45% and at most approximately 55%.

According to the other aspect of the present invention, an optical multiplexer/demultiplexer includes a first optical waveguide, a second optical waveguide, a directional coupling portion in which the first and the second optical waveguides are provided to transfer a light between the first and second optical waveguides, and a multi-mode interferometer waveguide to which the first and second optical waveguides are connected. The directional coupling portion and the multi-mode interferometer waveguide are provided such that a length of the first optical waveguide between the directional coupling portion and the multi-mode interferometer waveguide and a length of the second optical waveguide between the directional coupling portion and the multi-mode interferometer waveguide have a difference (ΔL). A product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5. The cross-propagation wavelength (λ2) is a wavelength of a cross-propagation light which propagates from the first optical waveguide to the second optical waveguide or from the second optical waveguide to the first optical waveguide. The through-propagation wavelength (λ1) is a wavelength of a through-propagation light which propagates from an input to an output of the first optical waveguide or from an input to an output of the second optical waveguide. Power coupling ratio differences between first power coupling ratios of the directional coupling portion and the multi-mode interferometer waveguide with respect to the cross-propagation wavelength (λ2) and second power coupling ratios of the directional coupling portion and the multi-mode interferometer waveguide with respect to the through-propagation wavelength (λ1) are at least approximately 1% and at most approximately 10%. Third power coupling ratios of the directional coupling portion and the multi-mode interferometer waveguide with respect to an average wavelength of the cross-propagation wavelength (λ2) and the through-propagation wavelength (λ2) are at least approximately 45% and at most approximately 55%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
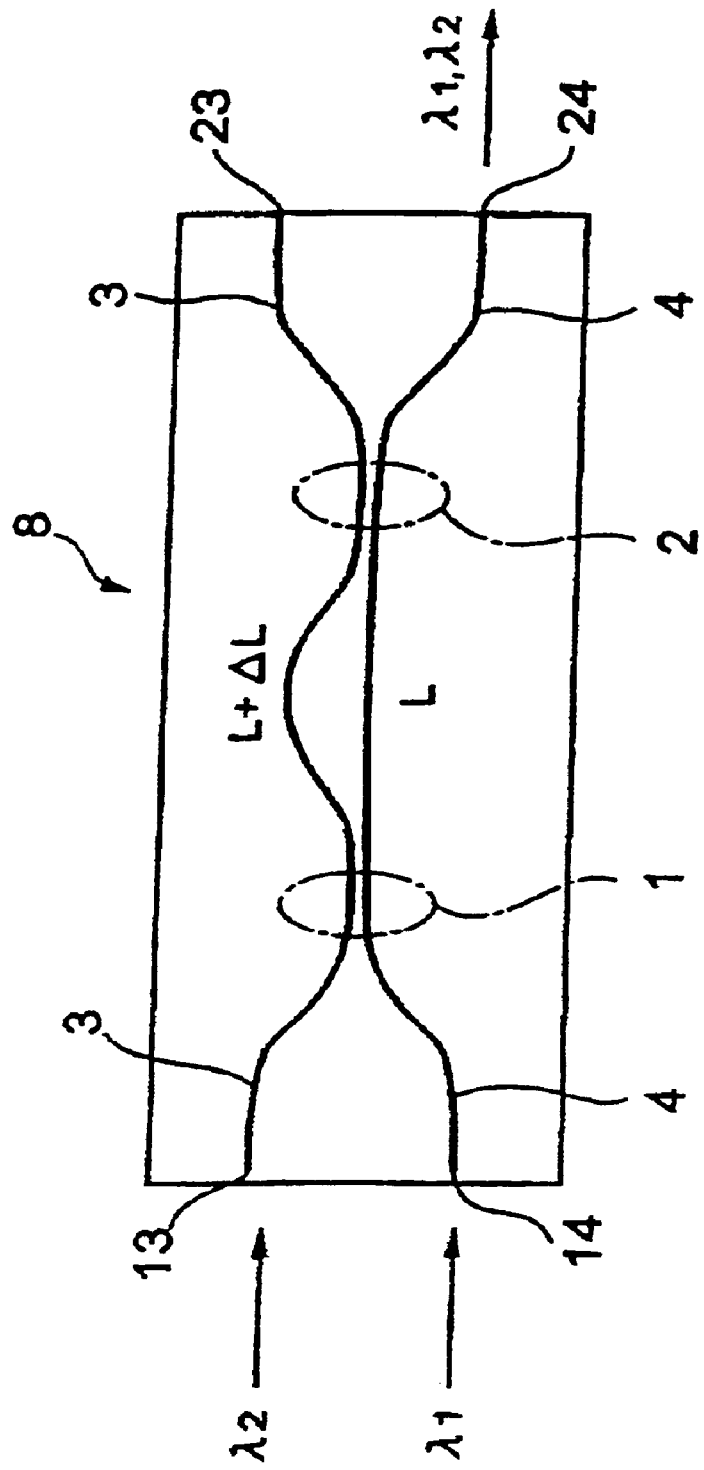
FIG. 1 is a schematic view showing an optical multiplexer/demultiplexer of the first embodiment according to the present invention.

The preferred embodiments will now be described with reference to the accompanying drawings, wherein like reference numerals designate corresponding or identical elements throughout the various drawings.

FIG. 1 illustrates an optical multiplexer/demultiplexer of one embodiment according to the present invention. Referring to FIG. 1, the optical multiplexer/demultiplexer 8 of this embodiment is a Mach-Zehnder Interferometer type optical multiplexer/demultiplexer which includes a waveguide structure provided on a silicon substrate as shown in FIG. 1.

The optical multiplexer/demultiplexer 8 includes a first optical waveguide 3, a second optical waveguide 4, a first directional coupling portion 1 and a second directional coupling portion 2. The first and second optical waveguides (3 and 4) are provided side by side. The first and second optical waveguides (3 and 4) are closely provided each other in the first and second directional coupling portions (1 and 2). The second directional coupling portion 2 is provided separate from the first directional coupling portion 1 in a direction in which the first and second optical waveguides (3 and 4) extend. In the Mach-Zehnder Interferometer type optical multiplexer/demultiplexer 8, the first and second directional coupling portions (1 and 2) are provided such that the length of the first optical waveguide 3 between the first and second directional coupling portions (1 and 2) and the length of the second optical waveguide 4 between the first and second directional coupling portions (1 and 2) have a difference ($\Delta L$). A product ($n \times \Delta L$) between the difference ($\Delta L$) and a refractive index (n) of the first and second optical waveguides (3 and 4) is determined as a predetermined value.

In the Mach-Zehnder Interferometer type optical multiplexer/demultiplexer 8, an optical route from an input side 13 of the first optical waveguide 3 to an output side 23 of the first optical waveguide 3 or from an input side 14 of the second optical waveguide 4 to an output side 24 of the second optical waveguide 4 is a through route. In the present specification, a wavelength of light (through-propagation light) which is transmitted in the through route is referred to as a through-propagation wavelength ($\lambda 1$).

In the Mach-Zehnder Interferometer type optical multiplexer/demultiplexer 8, an optical route from the input side 13 of the first optical waveguide 3 to the output side 24 of the second optical waveguide 4 or from the input side 14 of the second optical waveguide 4 to the output side 23 of the first optical waveguide 3 is a cross route. In the present specification, a wavelength of light (cross-propagation light) which is transmitted in the cross route is referred to as a cross-propagation wavelength ($\lambda 2$).

The optical multiplexer/demultiplexer 8 has second power coupling ratios of the first and second directional coupling portions 1, 2 respectively with respect to a through-propagation wavelength $\lambda 1$ and first power coupling ratios of the first and second directional coupling portions 1, 2 respectively with respect to a cross-propagation wavelength λ2. According to the first embodiment of the present invention, the differences between the former and latter power coupling ratios are set to be at least approximately 1% and at most approximately 10%. Also, third power coupling ratios of the first and second directional coupling portions 1, 2 are in the range of 45% and 55% with respect to an average wavelength of the through-propagation wavelength λ1 and cross-propagation wavelength λ2.

For example, in Example 1-1 according to the first embodiment, the through-propagation wavelength λ1 was 1575 nm, and the cross-propagation wavelength λ2 was 1525 nm, the interval/pitch between the through-propagation wavelength λ1 and cross-propagation wavelength λ2 being 50 nm.

Figure 2:
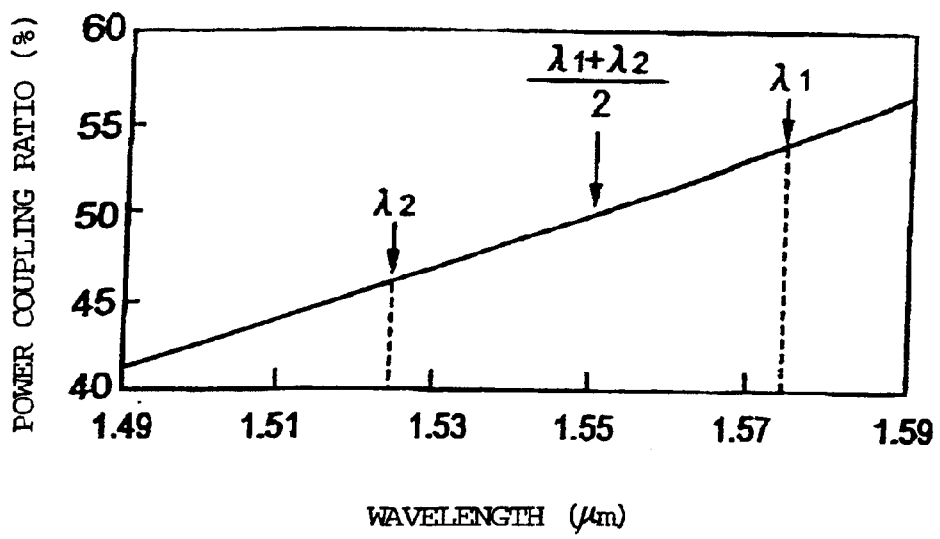
FIG. 2 is a graph showing a relationship between the power coupling ratios and wavelengths related to the optical multiplexer/demultiplexer of Example 1-1 according to the first embodiment.

FIG. 2 is an exemplary graph showing a relationship between the power coupling ratios and wavelengths for Example 1-1. Referring to FIG. 2, for the optical multiplexer/demultiplexer 8 of Example 1-1, the both power coupling ratios of the first and second directional coupling portions 1, 2 with respect to the through-propagation wavelength λ1 were set to be approximately 54%, and the both power coupling ratios of the first and second directional coupling portions 1, 2 with respect to the cross-propagation wavelength λ2 were set to be approximately 46%.

Thus, the differences (through-cross coupling ratio differences) between the power coupling ratios of the first and second directional coupling portions 1, 2 with respect to the cross-propagation wavelength λ2 and the power coupling ratios of the first and second directional coupling portions 1, 2 with respect to the through propagation wavelength λ1 were approximately 8%.

Also in this example, the average wavelength between the through-propagation wavelength λ1 and cross-propagation wavelength λ2, i.e., (λ1+λ2)/2, was 1550 nm, and the power coupling ratios of the first and second coupling portions 1, 2 were set to be 50% of this average wavelength.

The optical multiplexer/demultiplexer 8 includes Silica-based waveguide forming region, i.e., cladding glass and core glass, formed on the silicon substrate as shown in FIG. 1. The cladding glass is formed as a Silica-based glass, and the core glass is formed as a TiO$_2$ doped Silica-based glass. The Silica-based waveguide forming region is approximately 50 μm in film thickness. The percentage difference of the refractive indexes of the core glass and the cladding glass is 0.4%, and the cross-sectional dimension of the core glass is 8.0 μm×8.0 μm.

The first and second directional coupling portions 1, 2 is formed by providing a first waveguide 3 and a second waveguide 4 separated side by side by a few micrometers over a few hundred micrometers. The refractive indexes of the first and second waveguides 3, 4 are approximately 1.45.

Also, over a distance between the first and second directional coupling portions 1, 2, lengths of the first and second waveguides 3, 4 are L+ΔL and L, respectively. Thus, the difference in these lengths of the first and second waveguides 3, 4 is ΔL, e.g., ΔL=15.05 μm in Example 1-1.

In the optical multiplexer/demultiplexer of the first embodiment, a product between the difference, ΔL, and the refractive index, n, of the first and second waveguides 3, 4, i.e., n×ΔL, approximates a product between the cross-propagation wavelength λ2 and an integer (N), and a product between the through-propagation wavelength λ1 and the integer (N)±0.5. The integer (N) is 1 or more.

The relationships between the through-propagation wavelength λ1 and cross-propagation wavelength λ2 and the product, n×ΔL, can be expressed by following Equations (1) and (2), and if Δλ=|λ2−λ1|, following Equation (3) can be obtained. Values of λ1 and λ2 are not limited to a certain relationship.

$$n \times \Delta L = \lambda 1 \times (N \pm 0.5) \quad (1)$$

$$n \times \Delta L = \lambda 2 \times N \quad (2)$$

$$\Delta L = (\lambda 1 \times 2)/(2n \times \Delta \lambda) \quad (3)$$

Although a different ΔL can be selected for a different integer (N), the smallest ΔL is selected in this embodiment.

Further, rather than the integer (N), a value (N') which approximates the integer (N) within 0.1, i.e., (N−0.1)≦N'≦(N+0.1), may be used in determining ΔL. Effect of such a substitution would be negligible to the functions of the optical multiplexer/demultiplexer 8.

Referring to FIG. 2, by designing the optical multiplexer/demultiplexer 8 as such, its power coupling ratios were set as expected.

In other words, in the optical multiplexer/demultiplexer 8 of Example 1-1 according to the first embodiment, the both power coupling ratios of the first and second directional coupling portions 1, 2 with respect to the through-propagation wavelength λ1, i.e., λ1=1575 nm, were approximately 54%, and the both power coupling ratios of the first and second directional coupling portions 1, 2 with respect to the cross-propagation wavelength λ2, i.e., λ2=1525 nm, were approximately 46%. The through-cross coupling ratio differences between the power coupling ratios of the first and second directional coupling portions 1, 2 with respect to the through-propagation wavelength λ1 and the power coupling ratios of the first and second directional coupling portions 1, 2 with respect to the cross-propagation wavelength λ2 were approximately 8%.

Also, the power coupling ratios of the first and second coupling portions 1, 2 with respect to the average wavelength, 1550 nm, of the through-propagation wavelength λ1 and cross-propagation wavelength λ2 were 50%.

Figure 3:
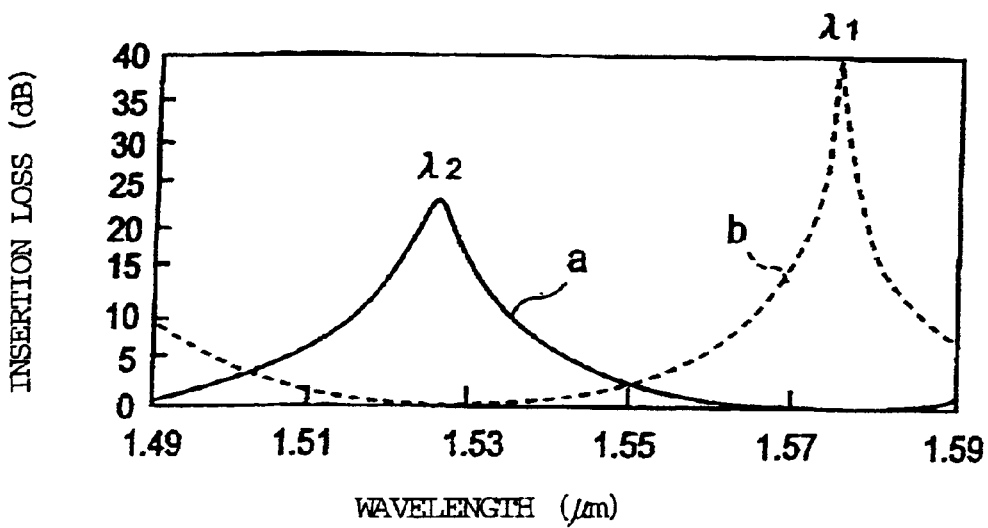
FIG. 3 is a graph showing a spectrum of insertion loss for the optical multiplexer/demultiplexer of Example 1-1.

FIG. 3 is a graph showing a spectrum of insertion loss for the optical multiplexer/demultiplexer of Example 1-1. Referring to FIG. 3, the line (a) indicates an insertion loss spectrum of a through path, and the line (b) indicates an insertion loss spectrum of a cross path.

As seen from the lines (a) and (b), the insertion losses of the through-propagation wavelength λ1 and cross-propagation wavelength λ2 were approximately 1 dB, respectively. Also, a crosstalk between these wavelengths λ1, λ2 in the through path, i.e., a propagation loss in the wavelength λ1 minus an isolation loss in the wavelength λ2, was approximately −24 dB.

In other words, the crosstalk in the optical multiplexer/demultiplexer of this example was lower than −15 dB, the permissible crosstalk value in optical multiplexers/demultiplexers, thereby realizing a smaller loss and a lower crosstalk.

In a circuit having directional coupling portions, the power coupling ratios of the directional coupling portions deviate ±5% due to its manufacturing discrepancies. Thus, it is not sufficient that the required characteristics are fulfilled only when the power coupling ratios of the first and second coupling portions 1, 2 with respect to the average wavelength, 1550 nm, of the through-propagation wavelength λ1 and cross-propagation wavelength λ2 are set to be 50%. Rather, the required characteristics are to be satisfied even when the power coupling ratios of the first and second connecting portions 1, 2 deviate in the range of 5%.

Thus, an optical multiplexer/demultiplexer of Example 1-2 according to the present embodiment was prepared such that the power coupling ratios of the first and second coupling portions 1, 2 with respect to the average wavelength between the wavelengths λ1 and λ2 were presumed to be 5% less than the intended power coupling ratios of 50%.

Figure 4:
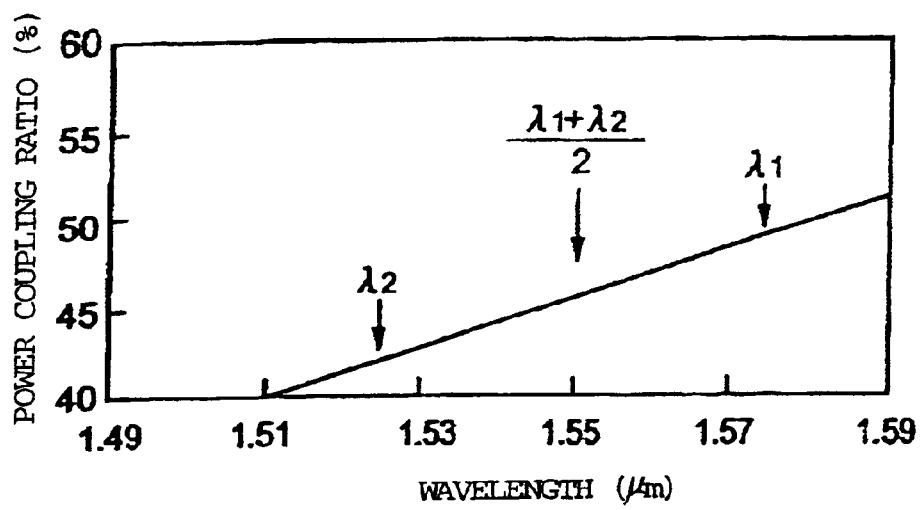
FIG. 4 is a graph showing a relationship between the power coupling ratios and wavelengths for the optical multiplexer/demultiplexer of Example 1-2 according to the first embodiment.

FIG. 4 is a graph showing a relationship between the power coupling ratios and wavelengths for Example 1-2 of the first embodiment. Referring to FIG. 4, the optical multiplexer/demultiplexer 8 of this example had the power coupling ratios of the first and second coupling portions 1, 2 with respect to the average wavelength, 1550 nm, between the wavelengths λ1 and λ2 of 45%.

In other words, in the optical multiplexer/demultiplexer 8 of Example 1-2, the both power coupling ratios of the first and second directional coupling portions 1, 2 with respect to the through-propagation wavelength λ1, i.e., λ1=1575 nm, were approximately 50%, and the both power coupling ratios of the first and second directional coupling portions 1, 2 with respect to the cross-propagation wavelength λ2, i.e., λ2=1525 nm, were approximately 42%. The differences between the power coupling ratios of the first and second directional coupling portions 1, 2 with respect to the through-propagation wavelength λ1 and the power coupling ratios of the first and second directional coupling portions 1, 2 with respect to the cross-propagation wavelength λ2 were approximately 8%.

Figure 5:
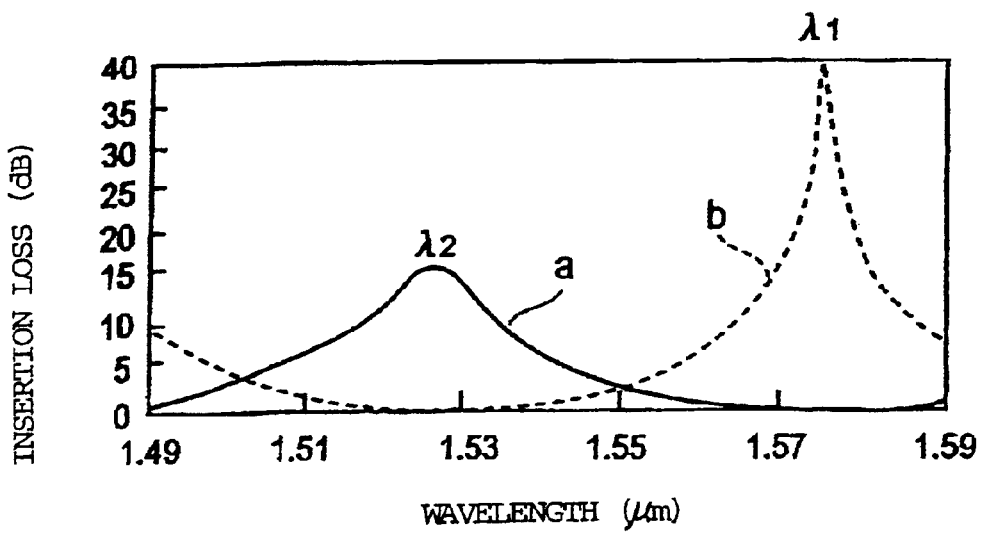
FIG. 5 is a graph showing a spectrum of insertion loss for the optical multiplexer/demultiplexer of Example 1-2.

FIG. 5 is a graph showing a spectrum of insertion loss for the optical multiplexer/demultiplexer 8 of Example 1-2. Referring to FIG. 5, the line (a) indicates an insertion loss spectrum of a through path, and the line (b) indicates an insertion loss spectrum of a cross path.

As seen from the lines (a) and (b), the insertion losses of the through-propagation wavelength λ1 and cross-propagation wavelength λ2 were approximately 1 dB, respectively. Also, a crosstalk between these wavelengths λ1, λ2 in the through path was approximately −16 dB, thereby satisfying the condition of being less than −15 dB and realizing a smaller loss and a lower crosstalk.

Furthermore, in light of the discrepancies caused during the manufacture of the directional coupling portions, an optical multiplexer/demultiplexer of Example 1-3 according to the first embodiment was made by presuming that the power coupling ratios of the first and second coupling portions 1, 2 with respect to the average wavelength between the wavelengths λ1 and λ2 would be 5% higher than the intended power coupling ratios of 50%.

Figure 6:
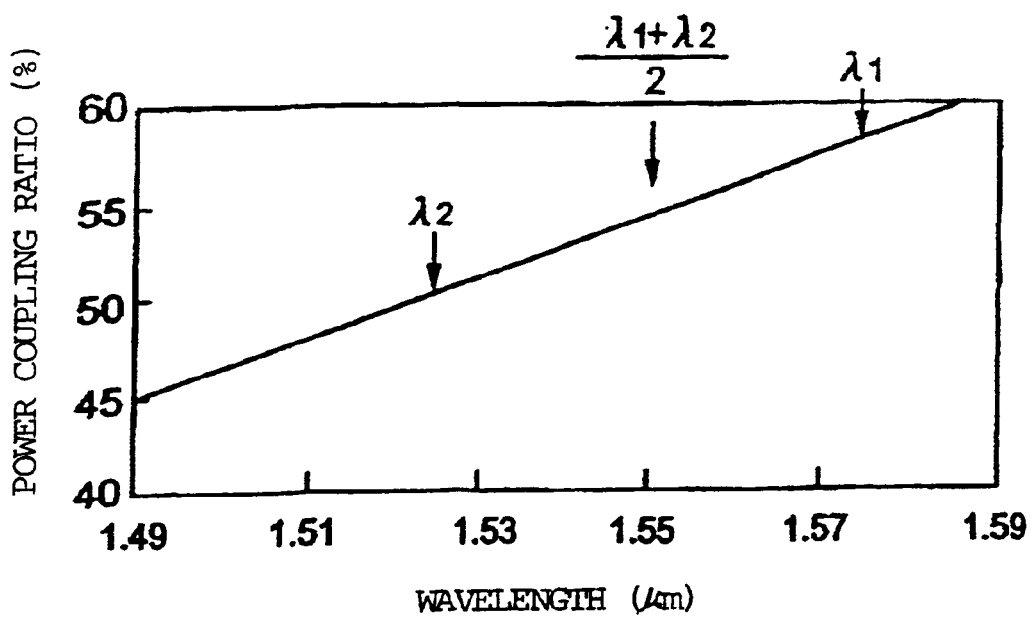
FIG. 6 is a graph showing a relationship between the power coupling ratios and wavelengths for the optical multiplexer/demultiplexer of Example 1-3 according to the first embodiment.

FIG. 6 is a graph showing a relationship between the power coupling ratios and wavelengths for Example 1-3.

Referring to FIG. 6, the optical multiplexer/demultiplexer 8 of this example had the power coupling ratios of the first and second coupling portions 1, 2 with respect to the average wavelength, 1550 nm, between the wavelengths λ1 and λ2 of 55%.

In other words, in the optical multiplexer/demultiplexer 8 of the first embodiment in this third example, the both power coupling ratios of the first and second directional coupling portions 1, 2 with respect to the through-propagation wavelength λ1, i.e., λ1=1575 m, were approximately 59%, and the both power coupling ratios of the first and second directional coupling portions 1, 2 with respect to the cross-propagation wavelength λ2, i.e., λ2=1525 nm, were approximately 51%. The differences between the power coupling ratios of the first and second directional coupling portions 1, 2 with respect to the through-propagation wavelength λ1 and the power coupling ratios of the first and second directional coupling portions 1, 2 with respect to the cross-propagation wavelength λ2 were approximately 8%.

Figure 7:
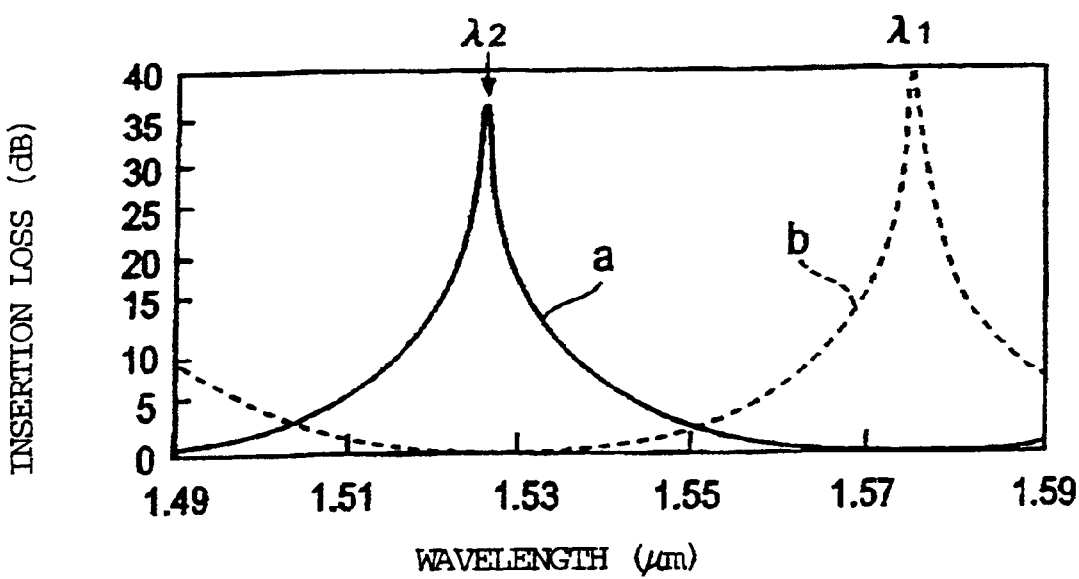
FIG. 7 is a graph showing a spectrum of insertion loss for the optical multiplexer/demultiplexer of Example 1-3.

FIG. 7 is a graph showing a spectrum of insertion loss for the optical multiplexer/demultiplexer 8 of the third example, Example 1-3. Referring to FIG. 7, the line (a) indicates an insertion loss spectrum of a through path, and the line (b) indicates an insertion loss spectrum of a cross path.

As seen from the lines (a) and (b), the insertion losses of the through-propagation wavelength λ1 and cross-propagation wavelength λ2 were approximately 1 dB, respectively. Also, a crosstalk between these wavelengths λ1, λ2 in the through path was approximately −37 dB, thereby satisfying the condition of being less than −15 dB and realizing a smaller loss and a lower crosstalk.

As seen from the aforementioned examples, by setting the differences between the power coupling ratios of the directional coupling portions 1, 2 with respect to the through-propagation wavelength λ1 and with respect to the cross-propagation wavelength λ2 to be at least approximately 1% and at most approximately 10% and setting these power coupling ratios to be in the range of 45% and 55% of an average wavelength of the through- and cross-propagation wavelengths λ1, λ2, the optical multiplexer/demultiplexer 8 of the first embodiment multiplexes lights or demultiplexes a light, which the wavelength dependency of the power coupling ratios of the directional coupling portions 1, 2 is not negligible, with a small loss and a lower crosstalk.

Table 1 below shows the characteristics of the three exemplary optical multiplexers/demultiplexers of the first embodiments discussed above. Also, Table 1 includes the results of experiments obtained for optical multiplexers/demultiplexers prepared for the purpose of comparison.

TABLE 1

|  |  | power coupling ratios for average wavelength (%) | difference in through - cross ratios (%) | crosstalk in through path (dB) | λ1 (nm) | λ2 (nm) | average wavelength (nm) |
|---|---|---|---|---|---|---|---|
| Exp 1 | Exp. 1-2 | 45 | 8 | −16 | 1575 | 1525 | 1550 |
|  | Exp. 1-1 | 50 |  | −24 |  |  |  |
|  | Exp. 1-3 | 55 |  | −37 |  |  |  |
| Comp 1 | Comp. 1-2 | 45 | 12 | −31 | 1510 | 1590 | 1550 |
|  | Comp. 1-1 | 50 |  | −18 |  |  |  |
|  | Comp. 1-3 | 55 |  | −14 |  |  |  |
| Comp 2 | Comp. 2-2 | 45 | 25 | −10 | 1610 | 1530 | 1570 |
|  | Comp. 2-1 | 50 |  | −13 |  |  |  |
|  | Comp. 2-3 | 55 |  | −23 |  |  |  |

TABLE 1-continued

|  |  | power coupling ratios for average wavelength (%) | difference in through - cross ratios (%) | crosstalk in through path (dB) | λ1 (nm) | λ2 (nm) | average wavelength (nm) |
|---|---|---|---|---|---|---|---|
| Comp 3 | Comp. 3-2 | 45 | 45 | −7 | 1330 | 1550 | 1440 |
|  | Comp. 3-1 | 50 |  | −4 |  |  |  |
|  | Comp. 3-3 | 55 |  | −3 |  |  |  |

Referring to Table 1, the optical multiplexers/demultiplexers of Comparisons 1-1, 1-2 and 1-3 have the structure shown in FIG. 1, and the difference, ΔL, i.e., a distance between the first and second waveguides over the distance between the first and second coupling portions, was 9.43 μm.

Still referring to Table 1, the optical multiplexers/demultiplexers of Comparisons 1-1, 1-2 and 1-3 were set such that their through-propagation wavelengths λ1 were 1510 nm, cross-propagation wavelengths λ2 were 1590 nm, average wavelengths of the through- and cross-propagation wavelengths were thus 1550 nm, and power coupling ratios at 1550 nm were intended to be 50%.

The optical multiplexers/demultiplexers of Comparison 1-1 had the power coupling ratios at the average wavelength, 1550 nm, of 50% as intended. The optical multiplexers/demultiplexers of Comparison 1-2 had the power coupling ratios at the average wavelength, 1550 nm, of 45% due to the discrepancies in the manufacturing process. The optical multiplexers/demultiplexers of Comparison 1-3 had the power coupling ratios at the average wavelength, 1550 nm, of 55% due to the discrepancies in the manufacturing process.

In the optical multiplexer/demultiplexer of Comparison 1-1, the both power coupling ratios of the first and second directional coupling portions with respect to the through-propagation wavelength λ1, i.e., λ1=1510 nm, were approximately 44%, and the both power coupling ratios of the first and second directional coupling portions with respect to the cross-propagation wavelength λ2, i.e., λ2=1590 nm, were approximately 56%. The differences between the power coupling ratios of the first and second directional coupling portions with respect to the through-propagation wavelength λ1 and the power coupling ratios of the first and second directional coupling portions with respect to the cross-propagation wavelength λ2 were approximately 12%. The crosstalk in the optical multiplexer/demultiplexer of Comparison 1-1 was approximately −18 dB.

However, in the optical multiplexer/demultiplexer of Comparison 1-3, i.e., one whose power coupling ratios at the average wavelength, 1550 nm, became 55% due to the discrepancies in the manufacturing process, the crosstalk was approximately −14 dB. Since the permissible crosstalk in an optical multiplexer/demultiplexer, i.e., a propagation loss in a propagation wavelength minus a cross loss in a cross wavelength, is −15 dB or lower, the optical multiplexer/demultiplexer of Comparison 1-3 could not satisfy such a condition.

Further, in the optical multiplexer/demultiplexer of Comparison 1-2, i.e., one whose power coupling ratios at the average wavelength, 1550 nm, became 45% due to the discrepancies in the manufacturing process, the cross talk was approximately −31 dB.

Referring to Table 1, the optical multiplexers/demultiplexers of Comparisons 2-1, 2-2 and 2-3 have the structure shown in FIG. 1, and the difference, ΔL, i.e., a distance between the first and second waveguides over the distance between the first and second coupling portions, was 10.6 μm.

Still referring to Table 1, the optical multiplexers/demultiplexers of Comparisons 2-1, 2-2 and 2-3 were set such that their through-propagation wavelengths λ1 were 1610 nm, cross-propagation wavelengths λ2 were 1530 nm, average wavelengths of the through- and cross-propagation wavelengths were thus 1570 nm, and power coupling ratios at 1570 nm were intended to be 50%.

The optical multiplexers/demultiplexers of Comparison 2-1 had the power coupling ratios at the average wavelength, 1570 run, of 50% as intended. The optical multiplexers/demultiplexers of Comparison 2-2 had the power coupling ratios at the average wavelength, 1570 nm, of 45% due to the discrepancies in the manufacturing process. The optical multiplexers/demultiplexers of Comparison 2-3 had the power coupling ratios at the average wavelength, 1570 nm, of 55% due to the discrepancies in the manufacturing process.

Figure 23:
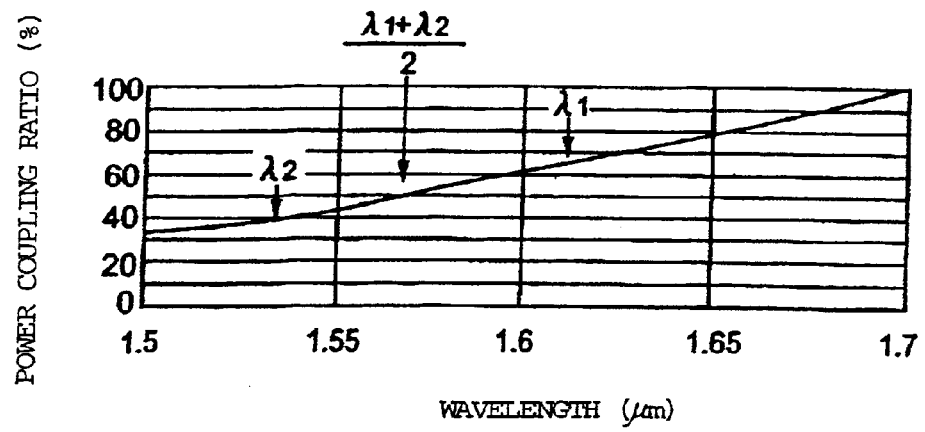
FIG. 23 is a graph showing a relationship between the power coupling ratios and wavelengths for the optical multiplexer/demultiplexer of Comparison 2-1.

FIG. 23 is a graph showing a relationship between the power coupling ratios and wavelengths for the optical multiplexer/demultiplexer of Comparison 2-1. Referring to FIG. 23, in the optical multiplexer/demultiplexer of Comparison 2-1, the both power coupling ratios of the first and second directional coupling portions with respect to the through-propagation wavelength λ1, i.e., λ1=1610 nm, were approximately 65%, and the both power coupling ratios of the first and second directional coupling portions with respect to the cross-propagation wavelength λ2, i.e., λ2=1530 nm, were approximately 40%. The differences between the power coupling ratios of the first and second directional coupling portions with respect to the through-propagation wavelength λ1 and the power coupling ratios of the first and second directional coupling portions with respect to the cross-propagation wavelength λ2 were approximately 25%.

Figure 24:
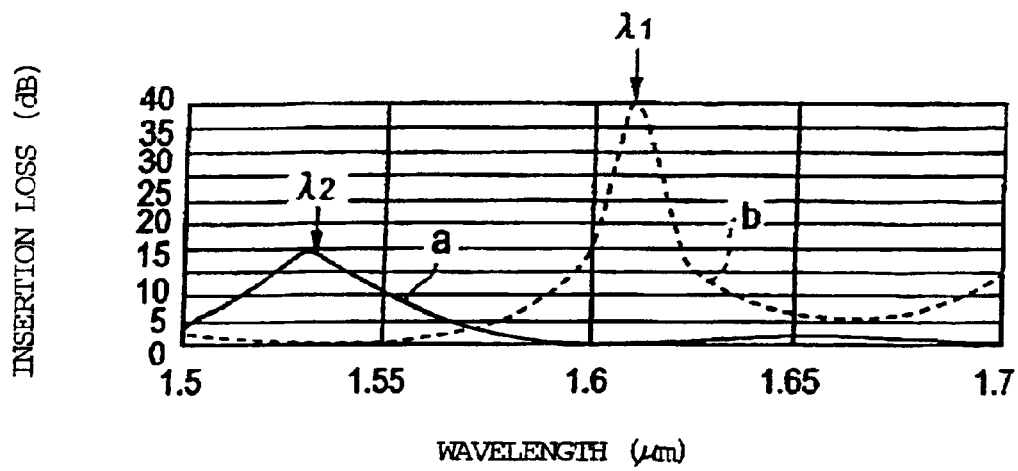
FIG. 24 is a graph showing a spectrum of insertion loss for the optical multiplexer/demultiplexer of Comparison 2-1.

FIG. 24 is a graph showing a spectrum of insertion loss for the optical multiplexer/demultiplexer of Comparison 2-1. Referring to FIG. 24, the line (a) indicates an insertion loss spectrum of a through path, and the line (b) indicates an insertion loss spectrum of a cross path.

As seen from the line (a), a crosstalk between these wavelengths λ1, λ2 in the through path was approximately −13 dB, and thus the condition of being −15 dB or lower was not satisfied. From this, it was found that even though the optical multiplexer/demultiplexer of Comparison 2-1 obtained the power coupling ratios at the average wavelength of these wavelengths λ1, λ2 as intended, a lower crosstalk could not be realized.

Further, in the optical multiplexer/demultiplexer of Comparison 2-2, i.e., one whose power coupling ratios at the average wavelength, 1570 nm, became 45% due to the discrepancies in the manufacturing process, the crosstalk was approximately −10 dB, and thus the optical multiplexer/demultiplexer of Comparison 2-2 could not satisfy the condition of being −15 dB or lower as in the case of the optical multiplexer/demultiplexer of Comparison 2-1.

In the optical multiplexer/demultiplexer of Comparison 2-3, i.e., one whose power coupling ratios at the average wavelength, 1570 nm, became 55% due to the discrepancies in the manufacturing process, the crosstalk was approximately −23 dB.

Referring to Table 1, the optical multiplexers/demultiplexers of Comparisons 3-1, 3-2 and 3-3 have the structure shown in FIG. 1, and the difference, ΔL, i.e., a distance between the first and second waveguides over the distance between the first and second coupling portions, was 3.2 μm.

Still referring to Table 1, the optical multiplexers/demultiplexers of Comparisons 3-1, 3-2 and 3-3 were set such that their through-propagation wavelengths λ1 were 1330 nm, cross-propagation wavelengths λ2 were 1550 nm, average wavelengths of the through- and cross-propagation wavelengths were thus 1440 nm, and power coupling ratios at 1440 nm were intended to be 50%.

The optical multiplexers/demultiplexers of Comparison 3-1 had the power coupling ratios at the average wavelength, 1440 nm, of 50% as intended. The optical multiplexers/demultiplexers of Comparison 3-2 had the power coupling ratios at the average wavelength, 1440 nm, of 45% due to the discrepancies in the manufacturing process. The optical multiplexers/demultiplexers of Comparison 3-3 had the power coupling ratios at the average wavelength, 1440 nm, of 55% due to the discrepancies in the manufacturing process.

Figure 25:
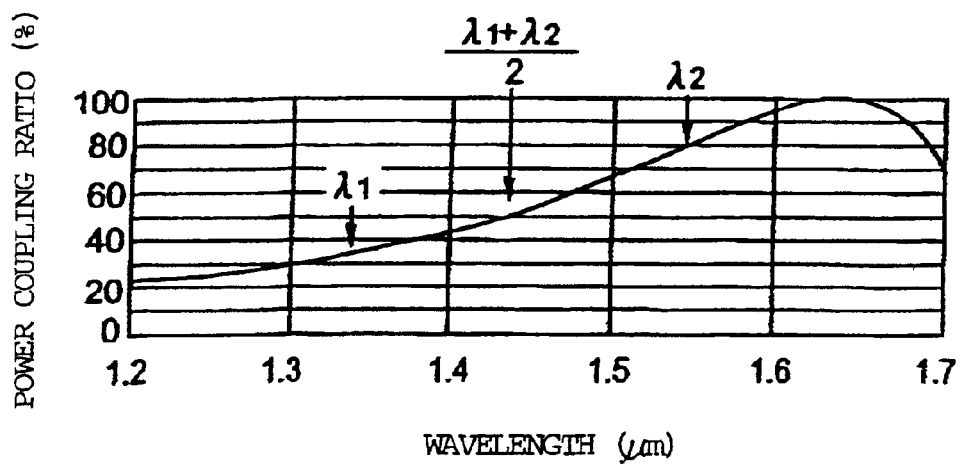
FIG. 25 is a graph showing a relationship between the power coupling ratios and wavelengths for the optical multiplexer/demultiplexer of Comparison 3-1.

FIG. 25 is a graph showing a relationship between the power coupling ratios and wavelengths for the optical multiplexer/demultiplexer of Comparison 3-1. Referring to FIG. 25, in the optical multiplexer/demultiplexer of Comparison 3-1, the both power coupling ratios of the first and second directional coupling portions with respect to the through-propagation wavelength λ1, i.e., λ1=1330 nm, were approximately 35%, and the both power coupling ratios of the first and second directional coupling portions with respect to the cross-propagation wavelength λ2, i.e., λ2=1550 nm, were approximately 80%. The differences between the power coupling ratios of the first and second directional coupling portions with respect to the through-propagation wavelength λ1 and the power coupling ratios of the first and second directional coupling portions with respect to the cross-propagation wavelength λ2 were approximately 45%.

Figure 26:
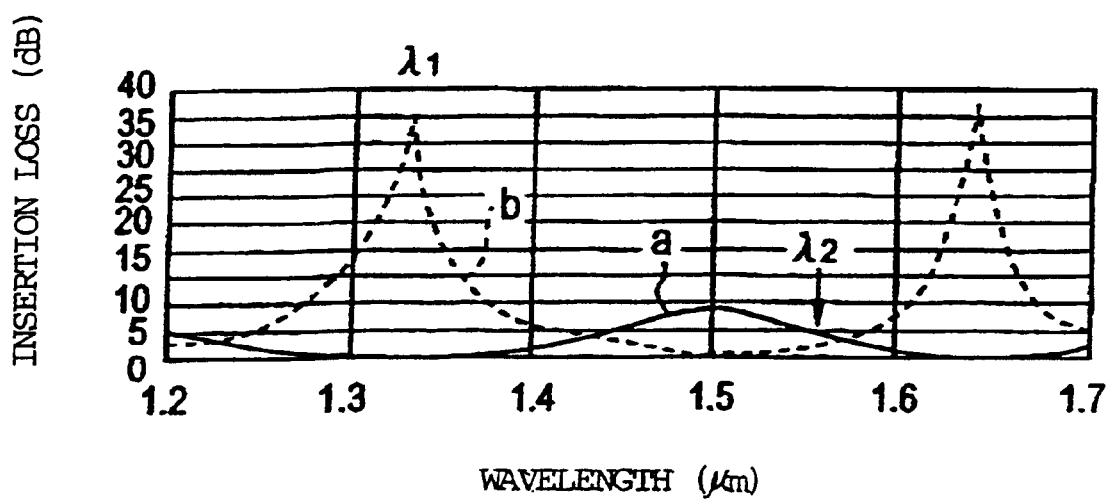
FIG. 26 is a graph showing a spectrum of insertion loss for the optical multiplexer/demultiplexer of Comparison 3-1.

FIG. 26 is a graph showing a spectrum of insertion loss for the optical multiplexer/demultiplexer of Comparison 3-1. Referring to FIG. 26, the line (a) indicates an insertion loss spectrum of a through path, and the line (b) indicates an insertion loss spectrum of a cross path.

As seen from the line (a), a crosstalk between these wavelengths λ1, λ2 in the through path, i.e., a propagation loss in the wavelength λ1 minus an isolation loss in the wavelength λ2, was only approximately −4 dB, resulting in a noticeably deteriorated crosstalk. From this, it was recognized that the propagation loss in the cross-propagation wavelength also deteriorated for a few decibels.

Further, in the optical multiplexer/demultiplexer of Comparison 3-2, i.e., one whose power coupling ratios at the average wavelength, 1440 nm, became 45% due to the discrepancies in the manufacturing process, the crosstalk was approximately −7 dB, and in the optical multiplexer/demultiplexer of Comparison 3-3, i.e., one whose power coupling ratios at the average wavelength, 1440 nm, became 55% due to the discrepancies in the manufacturing process, the crosstalk was approximately −3 dB.

As seen from the comparative examples above, the optical multiplexers/demultiplexers of Comparisons 3-1, 3-2 and 3-3, i.e., ones whose differences between the power coupling ratios of the directional coupling portions with respect to the through-propagation wavelength λ1 and with respect to the cross-propagation wavelength λ2 were approximately 45%, could not satisfy the condition of obtaining the crosstalk of −15 dB or lower. Therefore, it was found that even though the power coupling ratios at the average wavelength of these wavelengths λ1, λ2, 1440 nm, were approximately 50%, none of the optical multiplexers/demultiplexers of Comparisons 3-1, 3-2 and 3-3 were able to satisfy the condition of obtaining the crosstalk of −15 dB or lower. Also, it was found that a lower insertion loss could not have been accomplished either in the optical multiplexers/demultiplexers of Comparisons 3-1, 3-2 and 3-3.

Figure 8:
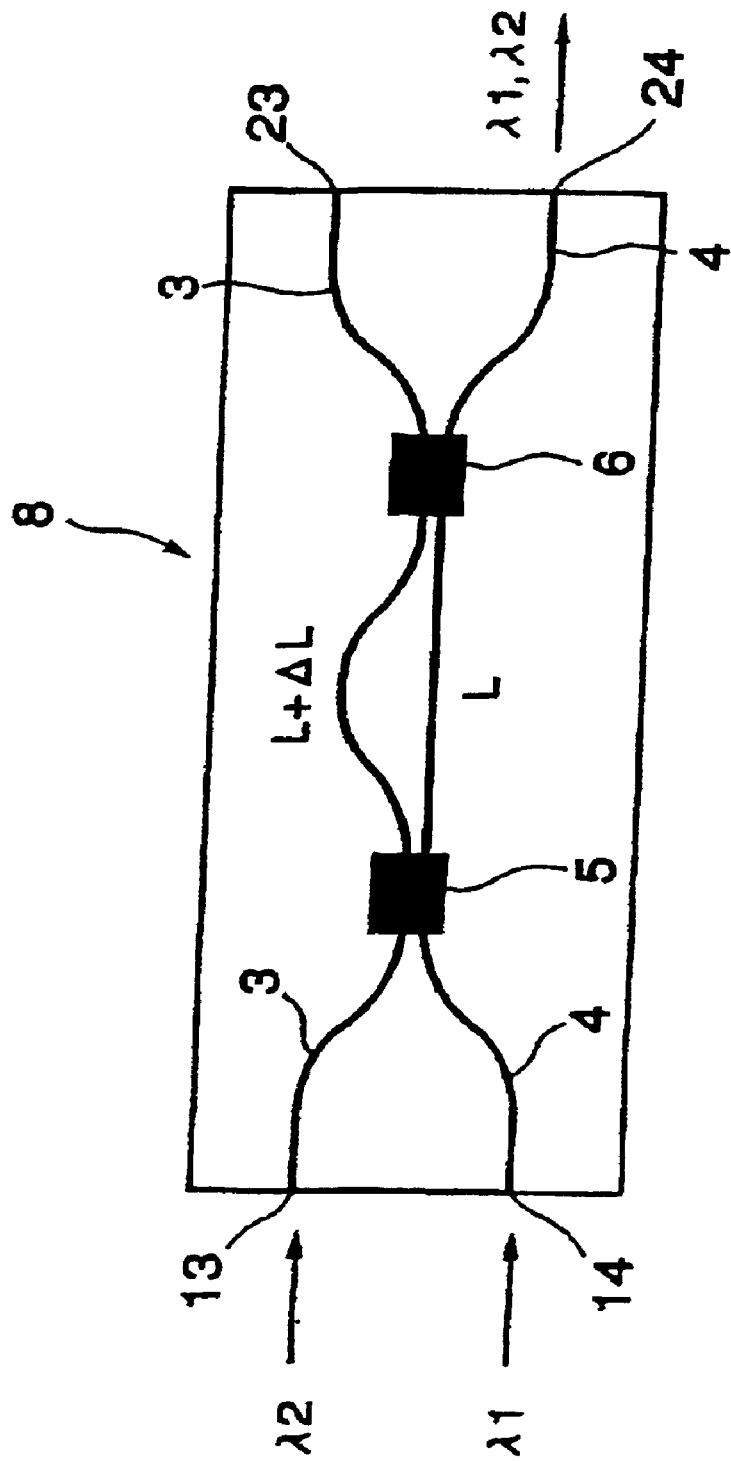
FIG. 8 is a schematic view showing an optical multiplexer/demultiplexer of the second embodiment according to the present invention.

FIG. 8 is a plan view diagram showing an optical multiplexer/demultiplexer of the second embodiment according to the present invention. Referring to FIG. 8, the optical multiplexer/demultiplexer of the second embodiment includes first and second multi-mode interferometer waveguides 5, 6 which are substituted for the first and second directional coupling waveguides 1, 2 in the optical multiplexer/demultiplexer of the first embodiment and have the equivalent functions thereto.

Figure 9:
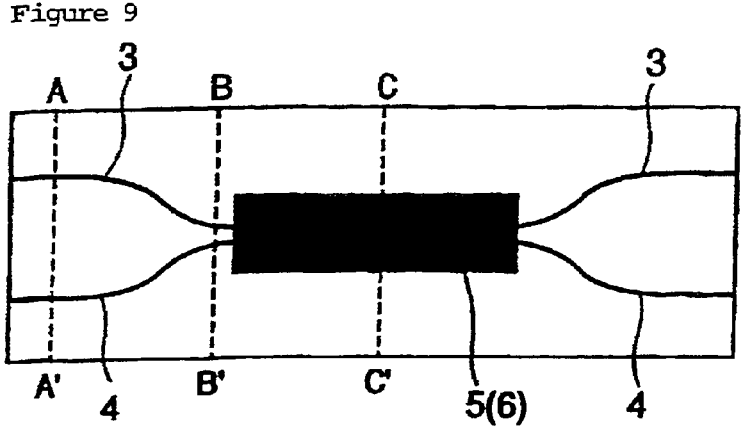
FIG. 9 is a schematic view showing one of the first and second multi-mode interferometer waveguides of the optical multiplexer/demultiplexer of the second embodiment.
Figure 10A:
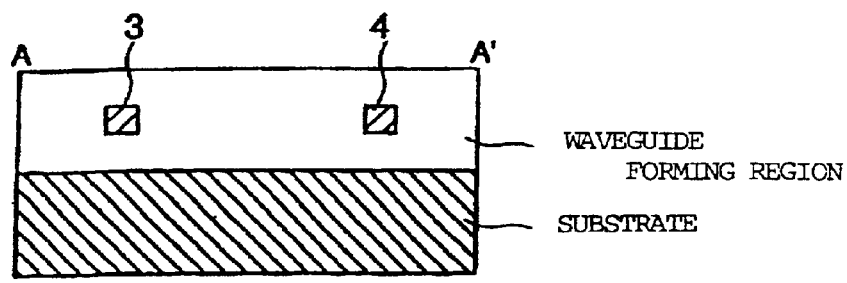
FIG. 10(a) is a cross-sectional view showing the multi-mode interferometer waveguide of the optical multiplexer/demultiplexer of the second embodiment across Line A–A'.
Figure 10B:
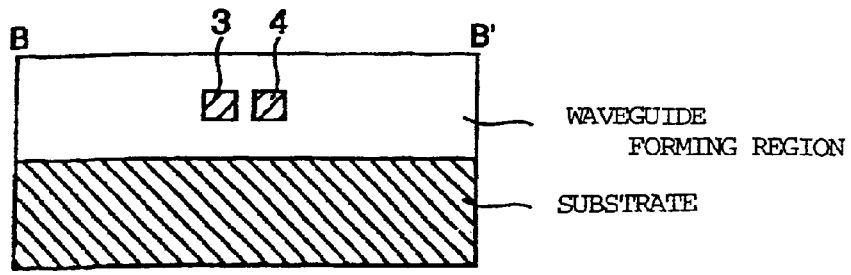
FIG. 10(b) is a cross-sectional view showing the multi-mode interferometer waveguide of the optical multiplexer/demultiplexer of the second embodiment across Line B–B'.
Figure 10C:
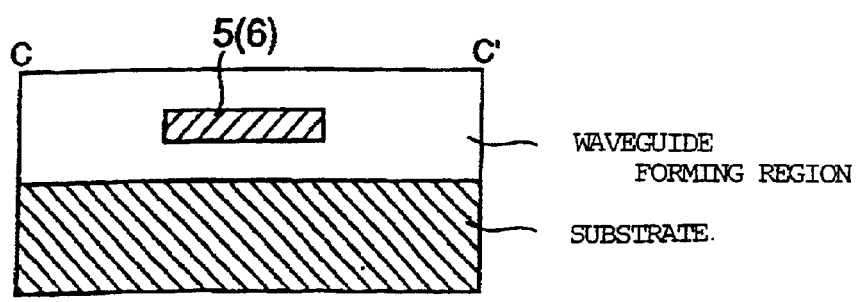
FIG. 10(c) is a cross-sectional view showing the multi-mode interferometer waveguide of the optical multiplexer/demultiplexer of the second embodiment across Line C–C'.

FIG. 9 is a plan view diagram showing one of the first and second multi-mode interferometer waveguides 5, 6, and FIGS. 10(a), 10(b) and 10(c) are cross-section diagrams showing the multi-mode interferometer waveguide 5, 6 across Line A–A', Line B–B' and Line C–C', respectively.

Referring to FIGS. 9, 10(a), 10(b) and 10(c), a multi-mode region of the multi-mode interferometer waveguide 5, 6, i.e., a main portion of the multi-mode interferometer waveguide 5, 6, is a core glass formed into a slab waveguide in a substantially rectangular shape. The width and length of the multi-mode region are approximately a several tens of micrometers and a several hundreds micrometers, respectively.

For the purpose of simplicity in design, the first and second multi-mode waveguides 5, 6 of the second embodiment are in the rectangular form as shown in FIG. 9. However, the first and second multi-mode interferometer waveguides 5, 6 are not limited to such a form according to the present invention as long as they are a coupler using the multi-mode effect. In other words, an optical multiplexer/demultiplexer of according to the present invention includes multi-mode interferometer waveguides capable of propagating a base mode and a higher more other than the base mode in their optical propagation mode.

Figure 11:
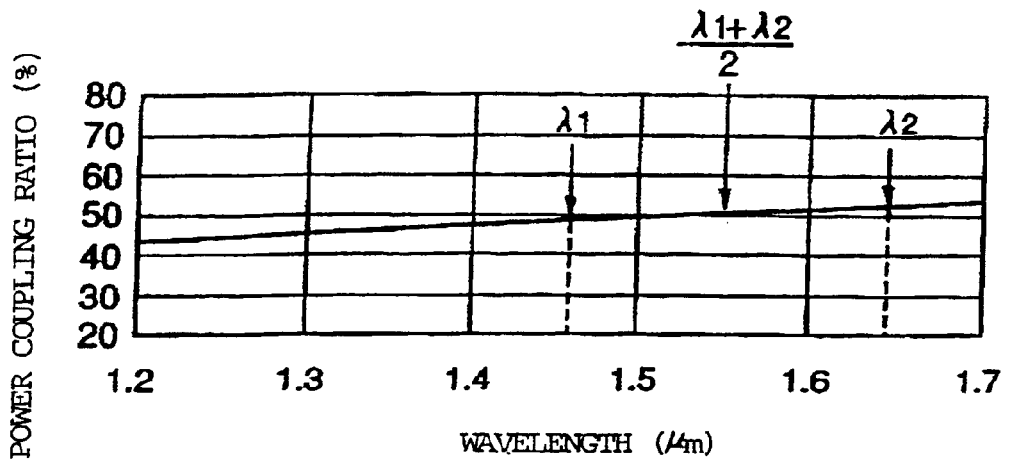
FIG. 11 is a graph showing a relationship between the power coupling ratios and wavelengths for the optical multiplexer/demultiplexer of Example 2-1 according to the second embodiment.

FIG. 11 is a graph showing a relationship between the power coupling ratios and wavelengths for an optical multiplexer/demultiplexer of Example 2-1 according to the second embodiment. Target power coupling ratios of the first and second multi-mode interferometer waveguides 5, 6 of Example 2-1 have the wavelength dependency seen from FIG. 11. In other words, the both power coupling ratios of the first and second multi-mode interferometer waveguides 5, 6 with respect to the through-propagation wavelength λ1, i.e., λ1=1460 nm, are approximately 47%, and the both power coupling ratios of the first and second multi-mode interferometer waveguides 5, 6 with respect to the cross-propagation wavelength λ2, i.e., λ2=1640 nm, are approximately 53%. The differences between the power coupling ratios of the first and second multi-mode interferometer waveguides 5, 6 with respect to the through-propagation wavelength λ1 and the power coupling ratios of the first and second multi-mode interferometer waveguides 5, 6 with respect to the cross-propagation wavelength λ2 are approximately 6%.

Also in this example, the power coupling ratios of the first and second multi-mode interferometer waveguides 5, 6 were set to be 50% with respect to the average wavelength between the through-propagation wavelength λ1 and cross-propagation wavelength λ2, 1550 nm, i.e., (λ1+λ2)/2.

The optical multiplexer/demultiplexer of Example 2-1 had the power coupling ratios as intended as seen in FIG. 11.

Figure 12:
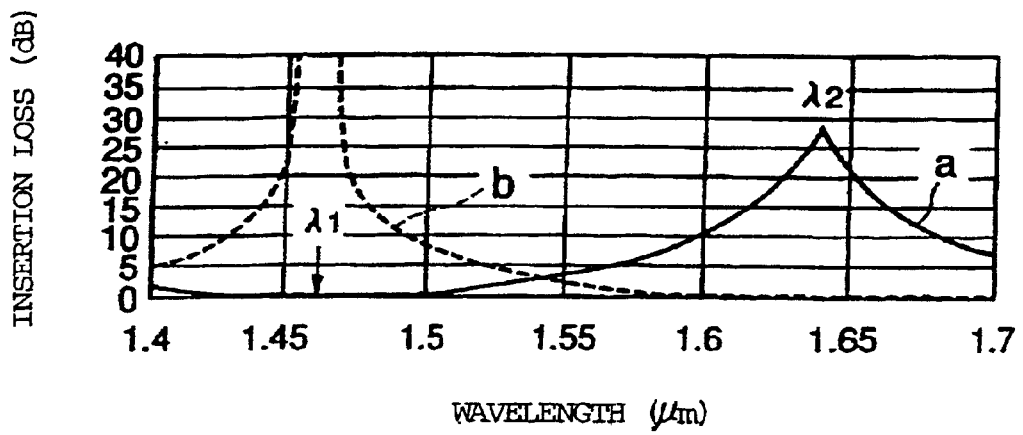
FIG. 12 is a graph showing a spectrum of insertion loss for the optical multiplexer/demultiplexer of Example 2-1.

FIG. 12 is a graph showing a spectrum of insertion loss for the optical multiplexer/demultiplexer of Example 2-1 according to the second embodiment. Referring to FIG. 12, the line (a) indicates an insertion loss spectrum of a through path, and the line (b) indicates an insertion loss spectrum of a cross path.

As seen from the lines (a) and (b), propagation losses for both the through- and cross-propagation wavelengths were approximately 1 dB, and a crosstalk between these wavelengths λ1, λ2 in the through path, i.e., a propagation loss in the wavelength λ1 minus an isolation loss in the wavelength 22, was approximately −28 dB, thereby fulfilling the condition of being −15 dB or lower and realizing a small loss and a lower crosstalk.

Further, in an optical multiplexer/demultiplexer of Example 2-2, i.e., one prepared according to the second embodiment and resulted in the power coupling ratios at the average wavelength, 1550 nm, of 45% due to the discrepancies in the manufacturing process, the crosstalk was approximately −24 dB. Furthermore, in an optical multiplexer/demultiplexer of Example 2-3, i.e., one prepared according to the second embodiment and resulted in the power coupling ratios at the average wavelength, 1550 nm, of 55% due to the discrepancies in the manufacturing process, the crosstalk was approximately −17 dB.

Table 2 below shows the characteristics of the three exemplary optical multiplexers/demultiplexers 2-1, 2-2, and 2-3 of the second embodiments discussed above.

TABLE 2

| | | power coupling ratios for average wavelength (%) | difference in through - cross ratios (%) | crosstalk in through path (dB) | λ1 (nm) | λ2 (nm) | average wavelength (nm) |
|---|---|---|---|---|---|---|---|
| Exp 2 | Exp. 2-2 | 45 | 6 | −24 | 1460 | 1640 | 1550 |
| | Exp. 2-1 | 50 | | −28 | | | |
| | Exp. 2-3 | 55 | | −17 | | | |

Referring to Table 2, all of the optical multiplexers/demultiplexers of Examples 2-1, 2-2 and 2-3 were able to satisfy the condition of obtaining the crosstalk equal to or lower than −15 dB, and realized the similar advantages attributable to the optical multiplexers/demultiplexers of the first embodiment.

Figure 13:
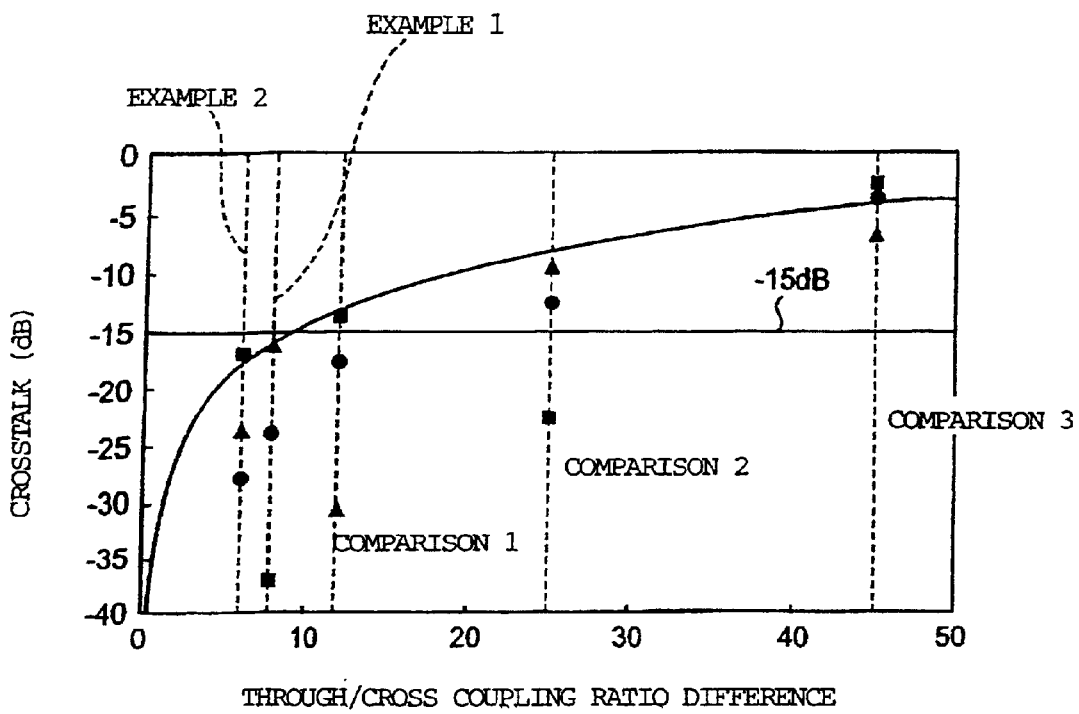
FIG. 13 is a graph showing summarized results prepared based on the data in Table 1 and 2 for Examples 1s and Comparisons 1s to 3s in the first embodiment and Examples 2s in the second embodiment.

FIG. 13 is a graph showing summarized results prepared based on the data in Table 1 and 2 for Examples 1s and Comparisons 1s to 3s in the first embodiment and Examples 2s in the second embodiment. In particular, FIG. 13 illustrates relationships between the crosstalks and differences of the power coupling ratios with respect to the through- and cross-propagation wavelengths for the multiplexers/demultiplexers of those examples.

Also, the crosstalks shown in FIG. 13 are the crosstalks between the wavelengths λ1, λ2 with respect to the through path since they are higher than those with respect to the cross path.

Referring to FIG. 13, ▲ represents the data of the multiplexers/demultiplexers having the power coupling ratios of 45% with respect to the average wavelength, ● represents the data of the multiplexers/demultiplexers having the power coupling ratios of 50% with respect to the average wavelength, and ■ represents the data of the multiplexers/demultiplexers having the power coupling ratios of 55% with respect to the average wavelength.

As seen from FIG. 13, all of the multiplexers/demultiplexers of Examples 1s and Examples 2s were able to obtain a crosstalk lower than −15 dB regardless of the power coupling ratios at their respective average wavelengths.

In contrast, some or all of the multiplexers/demultiplexers of Comparisons 1s, 2s and 3s were not able to obtain a crosstalk lower than −15 dB depending on the power coupling ratios at their respective average wavelengths as seen from FIG. 13.

Furthermore, as seen from the area between the Examples 1s and Comparisons 1s in FIG. 13, as long as the power coupling ratios at the average wavelength of the through- and cross-propagation wavelengths are approximately 10% or less, the condition of obtaining a crosstalk equal to or lower than −15 dB can be realized.

Figure 14:
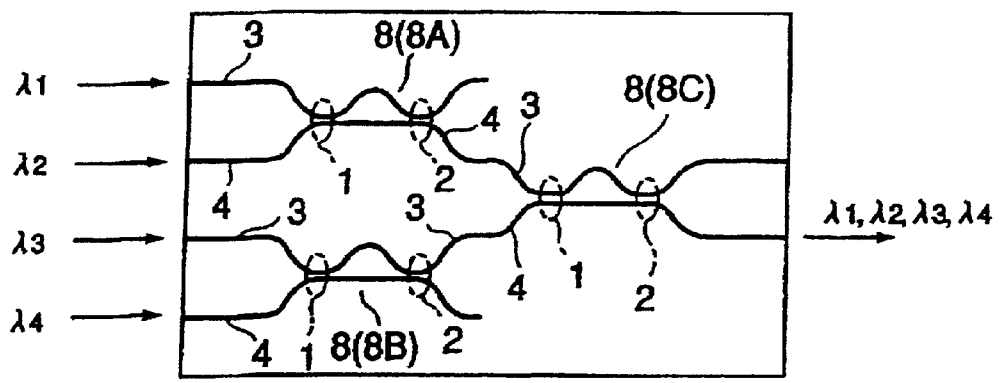
FIG. 14 is a schematic view showing an optical multiplexer/demultiplexer apparatus of the third embodiment according to the present invention.

FIG. 14 is a plan view diagram showing an optical multiplexer/demultiplexer apparatus of the third embodiment according to the present invention. Referring to FIG. 14, the optical multiplexer/demultiplexer apparatus of the third embodiment includes a multiple number of Mach-Zehnder type optical multiplexers/demultiplexers 8A, 8B, 8C similar to the one in the first embodiment. In particular, optical multiplexers/demultiplexers are provided in a tree form having multiple stages from Stage 1 to Stage M, M being an integer of at least 2, e.g., M being 2 in the third embodiment, and each stage having at least one optical multiplexer/demultiplexer.

Still referring to FIG. 14, two optical multiplexers/demultiplexers 8A, 8B are provided in parallel in Stage 1, and these optical multiplexers/demultiplexers 8A, 8B are positioned and connected to the optical multiplexer/demultiplexer 8C in Stage 2, respectively, in tandem toward the propagation direction of optical signals.

Thus, in the third embodiment, optical signals input from the first and second waveguides 3, 4 of the optical multiplexers/demultiplexers 8A, 8B in Stage 1 are multiplexed and output into the first and second waveguides 3, 4 of the optical multiplexer/demultiplexer 8A, 8B in Stage 1 respectively. For example, in FIG. 14, the optical multiplexer/demultiplexer 8A outputs a multiplexed optical signal into the second waveguide 4 of the optical multiplexer/demultiplexer 8A in Stage 1, and the optical multiplexer/demultiplexer 8B outputs a multiplexed optical signal into the first waveguide 3 of the optical multiplexer/demultiplexer 8B in Stage 1. Subsequently, these multiplexed optical signals from Stage 1 are multiplexed in the optical multiplexer/demultiplexer 8C in Stage 2.

In other words, the optical multiplexer/demultiplexer apparatus of the third embodiment further multiplexes a pair of optical signals multiplexed in and output from the preceding stage in the later stage. For example, referring to FIG. 14, the optical multiplexer/demultiplexer 8A in Stage 1 multiplexes two wavelengths, $\lambda 1$ and $\lambda 2$, while the optical multiplexer/demultiplexer 8B in Stage 1 multiplexes two wavelengths, $\lambda 3$ and $\lambda 4$. Then, the optical multiplexer/demultiplexer 8C in Stage 2 multiplexes all of the wavelengths, $\lambda 1, \lambda 2, \lambda 3$ and $\lambda 4$, and outputs into the second waveguide 4.

The wavelengths, $\lambda 1, \lambda 2, \lambda 3$ and $\lambda 4$ are lights each having a respective wavelength separated by a frequency pitch of 2 THz, i.e., $\lambda 1=1495.22$ nm, $\lambda 2=1465.98$ nm, $\lambda 3=1451.78$ nm, and $\lambda 4=1480.46$ nm.

Figure 15:
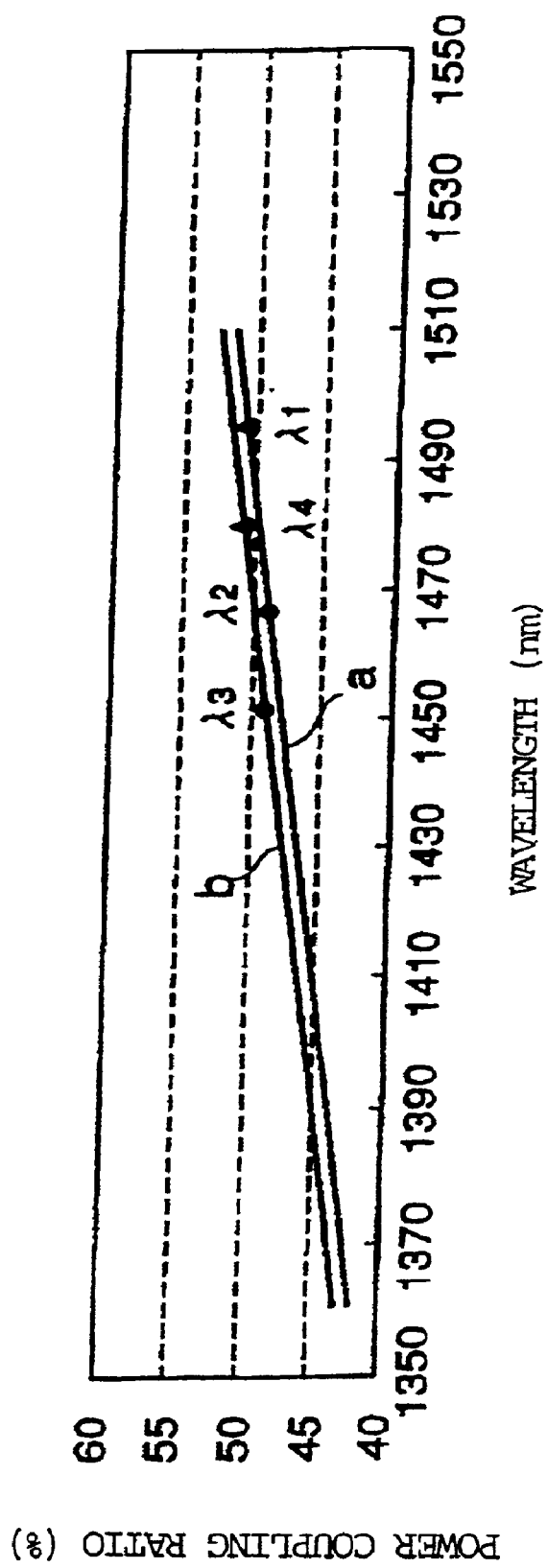
FIG. 15 is a graph showing relationships between the power coupling ratios and wavelengths for the optical multiplexer/demultiplexer apparatus of the third embodiment.
Figure 16:
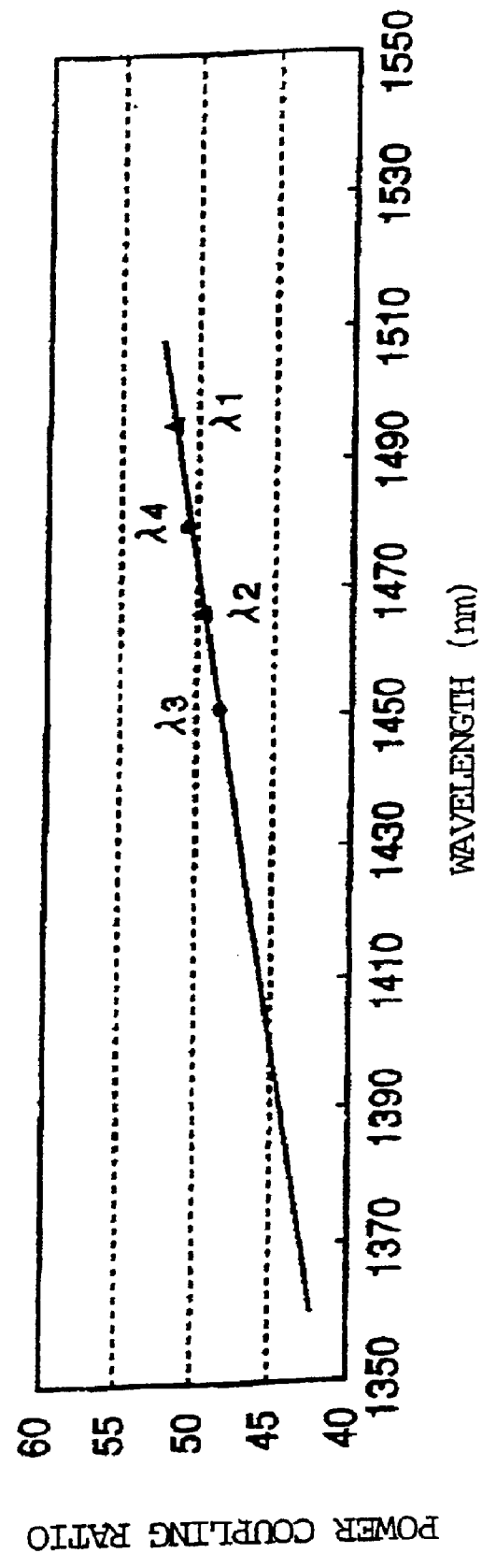
FIG. 16 is another graph showing relationships between the power coupling ratios and wavelengths for the optical multiplexer/demultiplexer apparatus of the third embodiment.

FIGS. 15 and 16 are graphs respectively showing relationships between the power coupling ratios and wavelengths. Referring to FIG. 15, Line (a) shows that the optical multiplexer/demultiplexer 8A in Stage 1 has the power coupling ratios of approximately 50% at the average wavelength $(\lambda 1+\lambda 2)/2$ of the two wavelengths $\lambda 1$ and $\lambda 2$ each being separated by a frequency pitch of 4 THz and the differences between the power coupling ratios with respect to the through- and cross-propagation wavelengths, i.e., the differences between the power coupling ratios with respect to the wavelength $\lambda 1$ and the wavelength $\lambda 2$ in this example, are set to be approximately 3%. In FIGS. 15 and 16, ● indicates the through-propagation wavelength, and ▲ indicates the cross-propagation wavelength.

Also referring to FIG. 15, Line (b) shows that the optical multiplexer/demultiplexer 8B in Stage 1 has the power coupling ratios of approximately 50% at the average wavelength $(\lambda 3+\lambda 4)/2$ of the two wavelengths $\lambda 3$ and $\lambda 4$ each being separated by a frequency pitch of 4 THz and the differences between the power coupling ratios with respect to the through- and cross-propagation wavelengths, i.e., the differences between the power coupling ratios with respect to the wavelength $\lambda 3$ and the wavelength $\lambda 4$ in this example, are set to be approximately 3%.

Referring to FIG. 16, the optical multiplexer/demultiplexer 8C in Stage 2 has the power coupling ratios of approximately 50% at the average wavelength $(\lambda 1+\lambda 2+\lambda 3+\lambda 4)/4$ of the four wavelengths $\lambda 1, \lambda 2, \lambda 3$ and $\lambda 4$ each being separated by a frequency pitch of 2 THz and the differences between the power coupling ratios with respect to all possible combinations of the through-propagation wavelengths, $\lambda 3$ and $\lambda 4$, and the cross-propagation wavelengths, $\lambda 1$ and $\lambda 2$, i.e., the differences between the power coupling ratios with respect to the wavelengths, $\lambda 1$ and $\lambda 3$, $\lambda 1$ and $\lambda 4$, $\lambda 2$ and $\lambda 3$, and $\lambda 2$ and $\lambda 4$, in this example, are at least approximately 1% and at most approximately 10%.

Figure 17:
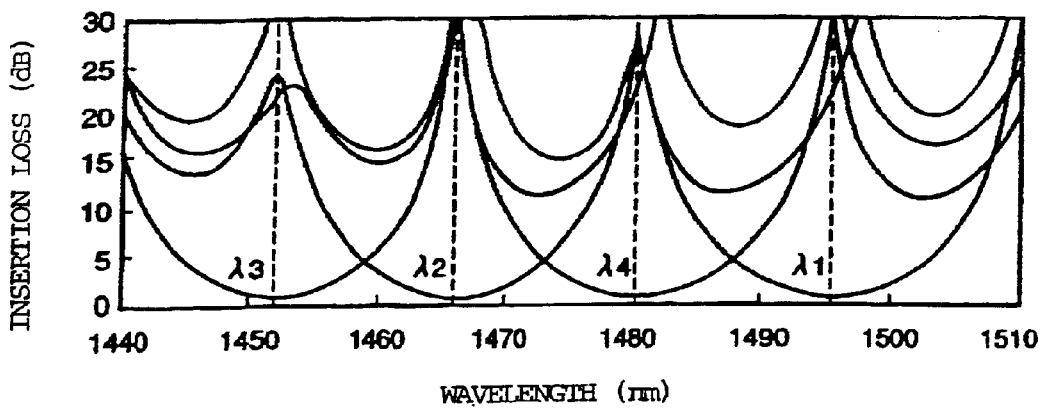
FIG. 17 is a spectrum showing relationships between insertion losses and the wavelengths input to the optical multiplexer/demultiplexer apparatus of the third embodiment.

FIG. 17 is a spectrum showing relationships between insertion losses and the wavelengths input to the optical multiplexer/demultiplexer apparatus of the third embodiment. Referring to FIG. 17, the optical multiplexer/demultiplexer apparatus of the third embodiment multiplexes the wavelengths, $\lambda 1, \lambda 2, \lambda 3$ and $\lambda 4$, input from four ports, respectively, with small losses, and realizes a low crosstalk.

Since the optical multiplexer/demultiplexer apparatus of the third embodiment has the characteristics of optical reciprocity, when a multiplexed light having the wavelengths, $\lambda 1, \lambda 2, \lambda 3$ and $\lambda 4$ is input from one of the first and second waveguides 3, 4 of the optical multiplexer/demultiplexer 8C in Stage 2, the optical multiplexer/demultiplexer 8C in Stage 2 demultiplexes this light and outputs to the first and second waveguides 3, 4 on the other side.

Then, the demultiplexed lights from the first and second waveguides 3, 4 are further demultiplexed respectively in the optical multiplexers/demultiplexers 8A, 8B in Stage 1 and thus output individually as lights having the wavelengths, $\lambda 1, \lambda 2, \lambda 3$ and $\lambda 4$, respectively. As such, the optical multiplexer/demultiplexer apparatus of the third embodiment can further demultiplex lights output from the later Stage with the optical multiplexers/demultiplexers in the preceding Stage.

Thus, the optical multiplexer/demultiplexer apparatus of the third embodiment demultiplexes the multiplexed light having the wavelengths, $\lambda 1, \lambda 2, \lambda 3$ and $\lambda 4$, with small losses, and realizes a low crosstalk.

Accordingly, the optical multiplexer/demultiplexer apparatus of the third embodiment multiplexes lights and demultiplexes a light, containing multiple wavelengths, in a broad band with small losses and a low crosstalk.

Figure 18:
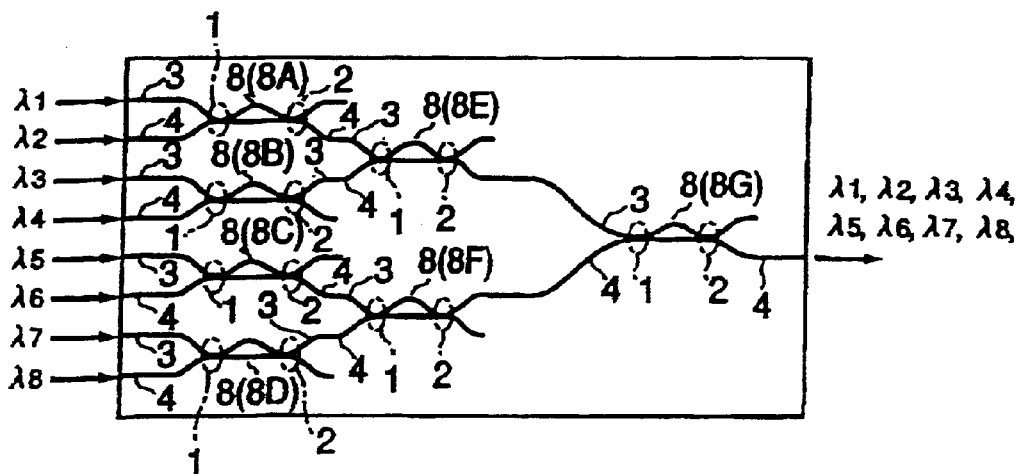
FIG. 18 is a schematic view showing an optical multiplexer/demultiplexer apparatus of the fourth embodiment.

FIG. 18 is a plan view diagram showing an optical multiplexer/demultiplexer apparatus of the fourth embodiment. Referring to FIG. 18, the optical multiplexer/demultiplexer apparatus of the fourth embodiment includes a multiple number of Mach-Zehnder type optical multiplexers/demultiplexers 8A, 8B, 8C, 8D, 8E, 8F, 8G similar to the one in the first embodiment. In particular, optical multiplexers/demultiplexers are provided in a tree form having multiple stages from Stage 1 to Stage M, M being an integer of at least 2, e.g., M being 3 in the fourth embodiment, and each stage having at least one optical multiplexer/demultiplexer.

In the fourth embodiment, optical signals input from the first and second waveguides 3, 4 of the optical multiplexers/demultiplexers 8A, 8B, 8C, 8D in Stage 1 are multiplexed and output into the first and second waveguides 3, 4 toward the optical multiplexers/demultiplexers 8E, 8F in Stage 2. The optical multiplexers/demultiplexers 8A, 8B output multiplexed optical signals into the first and second waveguides 3, 4 of the optical multiplexer/demultiplexer 8E in Stage 2, and the optical multiplexers/demultiplexers 8C, 8D output multiplexed optical signals into the first and second waveguides 3, 4 of the optical multiplexer/demultiplexer 8F in Stage 2.

Subsequently, these multiplexed optical signals from Stage 1 are multiplexed in the optical multiplexers/demultiplexers 8E, 8F in Stage 2, and output to and further multiplexed in the optical multiplexer/demultiplexer 8G in Stage 3. As such, the optical multiplexer/demultiplexer apparatus of the fourth embodiment further multiplexes a pair of optical signals multiplexed in and output from the preceding stage in the later stage as in the optical multiplexer/demultiplexer apparatus of the third embodiment.

For example, referring to FIG. 18, in Stage 1, the optical multiplexer/demultiplexer 8A multiplexes two wavelengths, $\lambda 1$ and $\lambda 2$, the optical multiplexer/demultiplexer 8B multiplexes two wavelengths, $\lambda 3$ and $\lambda 4$, the optical multiplexer/demultiplexer 8C multiplexes two wavelengths, $\lambda 5$ and $\lambda 6$, and the optical multiplexer/demultiplexer 8D multiplexes two wavelengths, $\lambda 7$ and $\lambda 8$. Then, in Stage 2, the optical multiplexer/demultiplexer, 8E, multiplexes the wavelengths, λ1, λ2, λ3 and λ4, and the optical multiplexer/demultiplexer, 8F, multiplexes the wavelengths, λ5, λ6, λ7 and λ8. Finally, in Stage 3, the optical multiplexer/demultiplexer 8G multiplexes all of the wavelengths, λ1, λ2, λ3, λ4, λ5, λ6, λ7 and λ8, and outputs into the second waveguide 4.

The wavelengths, λ1, λ2, λ3, λ4, λ5, λ6, λ7 and λ8, represent eight lights each having a respective wavelength separated by a frequency pitch of 2 THz, i.e., λ1=1451.78 nm, λ2=1510.29 nm, λ3=1480.46 nm, λ4=1424.19 nm, λ5=1410.79 nm, λ6=1465.98 nm, λ7=1495.22 nm, and λ8=1437.85 nm.

Figure 19:
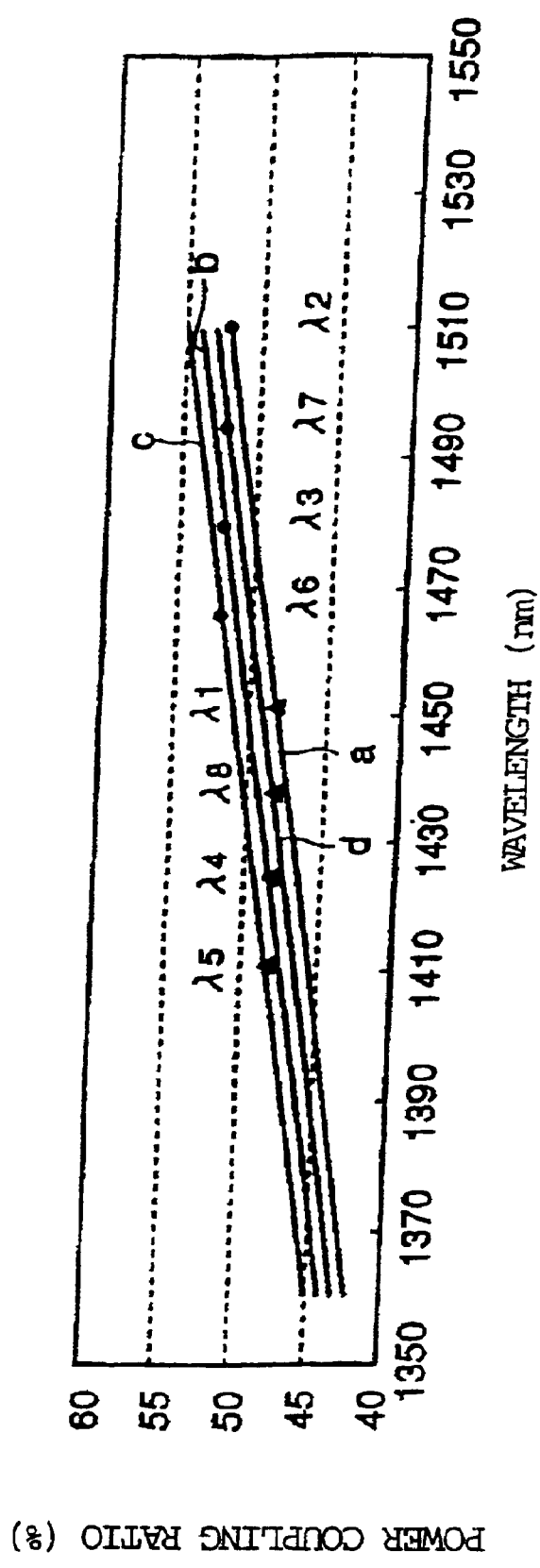
FIG. 19 is a graph showing relationships between the power coupling ratios and wavelengths for the optical multiplexer/demultiplexer apparatus of the fourth embodiment.
Figure 20:
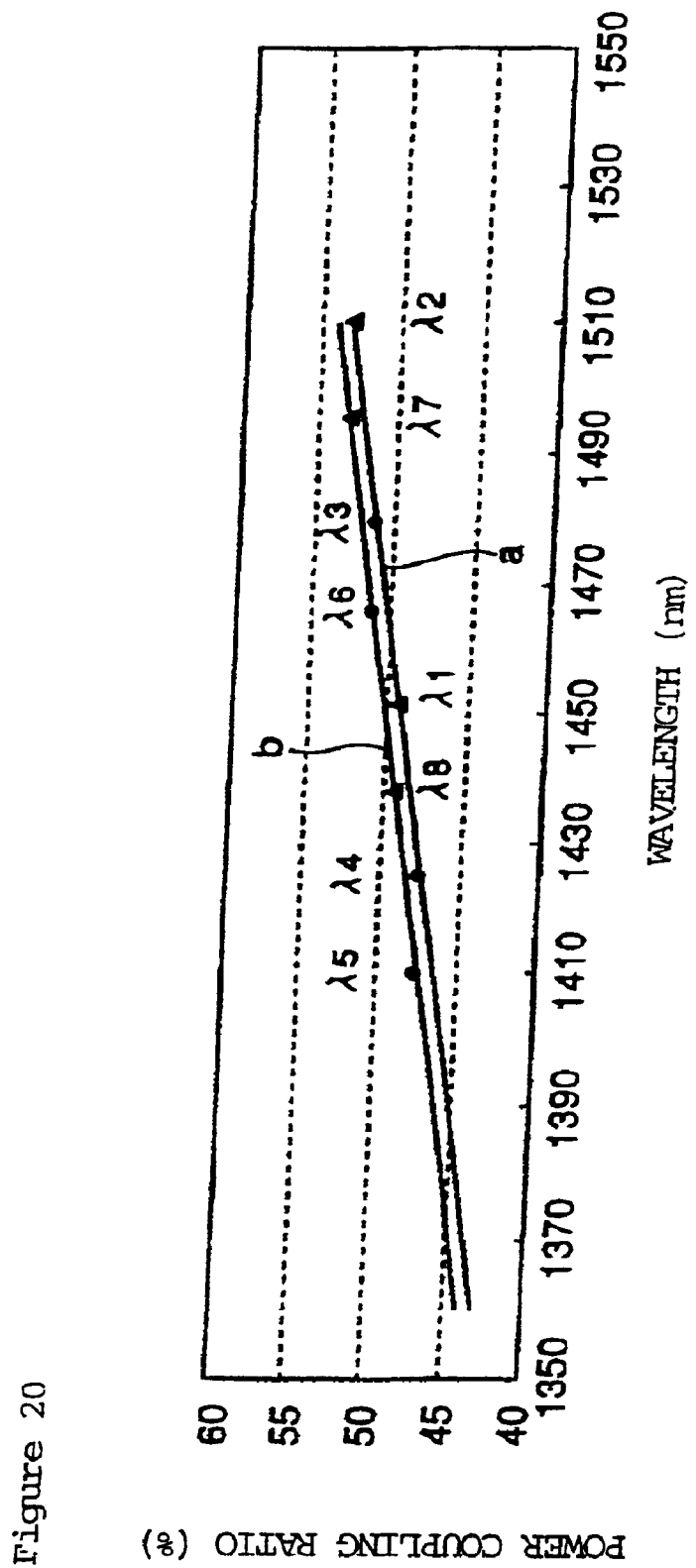
FIG. 20 is another graph showing relationships between the power coupling ratios and wavelengths for the optical multiplexer/demultiplexer apparatus of the fourth embodiment.
Figure 21:
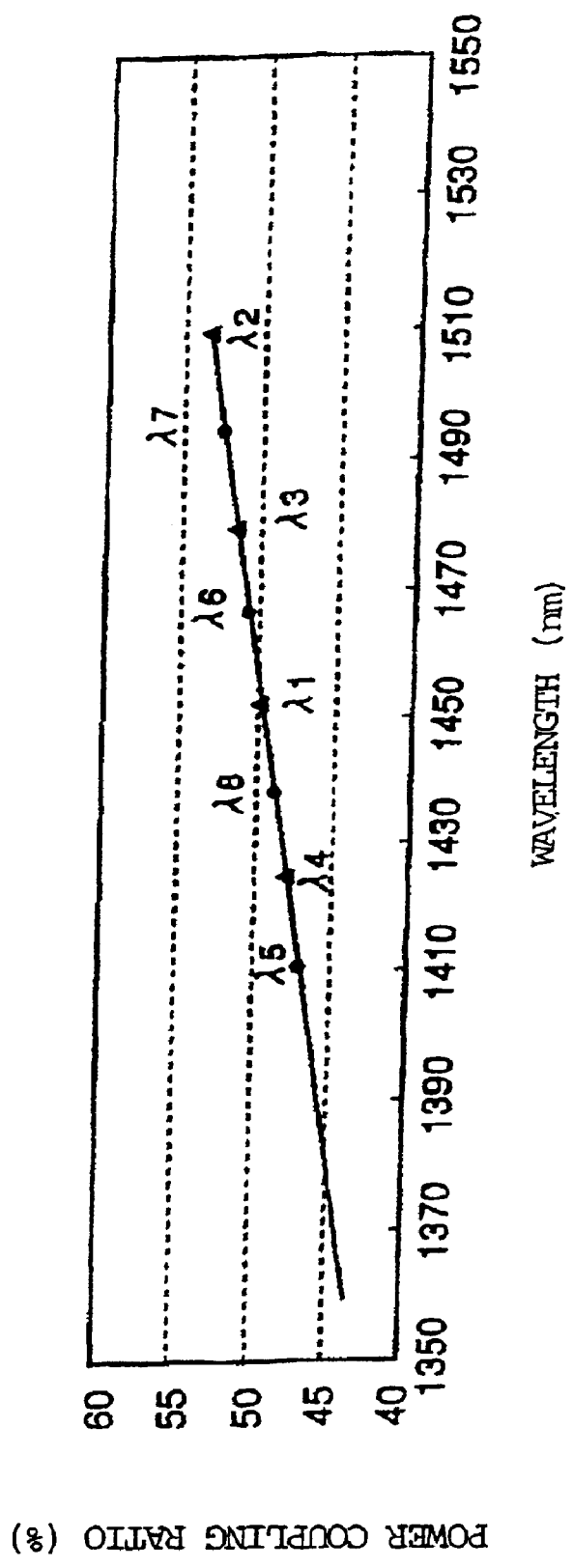
FIG. 21 is yet another graph showing relationships between the power coupling ratios and wavelengths for the optical multiplexer/demultiplexer apparatus of the fourth embodiment.

FIGS. 19, 20 and 21 are graphs respectively showing relationships between the power coupling ratios and wavelengths. Referring to FIG. 19, Line (a) shows that the optical multiplexer/demultiplexer, 8A, in Stage 1 has the power coupling ratios of approximately 50% at the average wavelength (λ1+λ2)/2 of the two wavelengths λ1 and λ2 each being separated by a frequency pitch of 8 THz and the differences between the power coupling ratios with respect to the through- and cross-propagation wavelengths, i.e., the differences between the power coupling ratios with respect to the wavelength λ1 and the wavelength λ2 in this example, are set to be approximately 4%. In FIGS. 19, 20 and 21, ● indicates the through-propagation wavelength, and ▲ indicates the cross-propagation wavelength.

Also referring to FIG. 19, Lines (b), (c) and (d) respectively show that the optical multiplexers/demultiplexers, 8B, 8C and 8D, in Stage 1 have the power coupling ratios of approximately 50% at the average wavelength of their respective two wavelengths each being separated by a frequency pitch of 8 THz, and the differences between the power coupling ratios with respect to the through- and cross-propagation wavelengths are set to be approximately 4%.

Referring to FIG. 20, Line (a) shows that the optical multiplexer/demultiplexer, 8E, in Stage 2 has the power coupling ratios of approximately 50% at the average wavelength (λ1+λ2+λ3+λ4)/4 of the four wavelengths λ1, λ2, λ3 and λ4 each being separated by a frequency pitch of 4 THz and the differences between the power coupling ratios with respect to all possible combinations of the through-propagation wavelengths, λ3 and λ4, and the cross-propagation wavelengths, λ1 and λ2, i.e., the differences between the power coupling ratios with respect to the wavelengths, λ1 and λ3, λ1 and λ4, λ2 and λ3, and λ2 and λ4, in this example, are at least approximately 1% and at most approximately 10%.

Still referring to FIG. 20, Line (b) shows that the optical multiplexer/demultiplexer, 8F, in Stage 2 has the power coupling ratios of approximately 50% at the average wavelength (λ5+λ6+λ7+λ8)/4 of the four wavelengths λ5, λ6, λ7 and λ8 each being separated by a frequency pitch of 4 THz and the differences between the power coupling ratios with respect to all possible combinations of the through-propagation wavelengths, λ7 and λ8, and the cross-propagation wavelengths, π5 and λ6, i.e., the differences between the power coupling ratios with respect to the wavelengths, λ5 and λ7, λ6 and λ7, λ5 and λ8, and λ6 and λ8, in this example, are at least approximately 1% and at most approximately 10%.

Referring to FIG. 21, the optical multiplexer/demultiplexer, 8G, in Stage 3 has the power coupling ratios of approximately 50% at the average wavelength (λ1+λ2+λ3+λ4+λ5+λ6+λ7+λ8)/8 of the eight wavelengths λ1, λ2, λ3, λ4, λ5, λ6, λ7 and λ8 each being separated by a frequency pitch of 2 THz and the differences between the power coupling ratios with respect to all possible combinations of the through-propagation wavelengths, λ5, λ6, λ7 and λ8, and the cross-propagation wavelengths, λ1, λ2, λ3 and λ4, are at least approximately 1% and at most approximately 10%.

Figure 22:
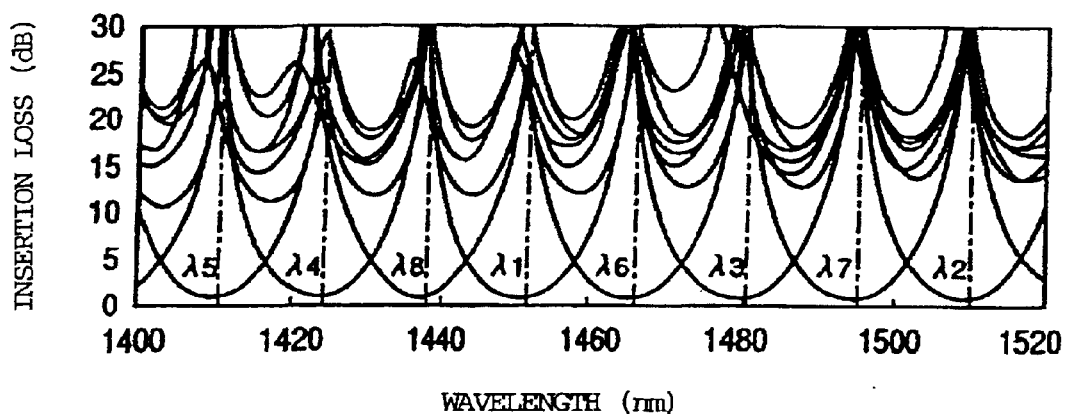
FIG. 22 is a spectrum showing relationships between insertion losses and the wavelengths input to the optical multiplexer/demultiplexer apparatus of the fourth embodiment.

FIG. 22 is a spectrum showing relationships between insertion losses and the wavelengths input to the optical multiplexer/demultiplexer apparatus of the fourth embodiment. Referring to FIG. 22, the optical multiplexer/demultiplexer apparatus of the fourth embodiment multiplexes the wavelengths, λ1, λ2, λ3, λ4, λ5, λ6, λ7 and λ8, input from eight ports, respectively, with small losses, and realizes a low crosstalk.

Since the optical multiplexer/demultiplexer apparatus of the fourth embodiment has the characteristics of optical reciprocity, when a multiplexed light having different wavelength is input from one of the first and second waveguides 3, 4 of the optical multiplexer/demultiplexer 8G in Stage 3, the optical multiplexer/demultiplexer 8G demultiplexes this light and outputs demultiplexed lights to the first and second waveguides 3, 4 on the other side similar to the optical multiplexer/demultiplexer apparatus of the third embodiment.

Then, the demultiplexed lights from the first and second waveguides 3, 4 are further demultiplexed respectively in the optical multiplexers/demultiplexers 8E, 8F in Stage 2 and thus finally output as demultiplexed lights each having a respective one of the wavelengths in the optical multiplexer/demultiplexer (8G) in stage 3.

Thus, the optical multiplexer/demultiplexer apparatus of the fourth embodiment demultiplexes the multiplexed lights having the wavelengths, λ1, λ2, λ3, λ4, λ5, λ6, λ7 and λ8, respectively, with small losses, and realizes a low crosstalk.

According to the present invention, the number of stages is not limited, and thus an optical multiplexer/demultiplexer may have a suitable number of stages depending on its settings. For example, an optical multiplexer/demultiplexer according to the present invention may have more than four stages of optical multiplexers/demultiplexers in a tree form.

Also, in the third and fourth embodiments, the optical multiplexers/demultiplexers having the first and second directional coupling portions 1, 2 in several stages. However, at least one optical multiplexer/demultiplexer may substitute the first and second directional coupling portions 1, 2 with the multi-mode interferometer waveguides 5, 6.

Further, according to the present invention, lights or a light to be multiplexed or demultiplexed are not limited to a certain wavelength, but may be appropriately selected as long as an optical multiplexer/demultiplexer has power coupling ratios of the first and second directional coupling portions respectively with respect to a through-propagation wavelength and power coupling ratios of the first and second directional coupling portions respectively with respect to a cross-propagation wavelength both in the range of 45% and 55% of an average wavelength of the through- and cross-propagation wavelengths, and the differences between the former and latter power coupling ratios are at least approximately 1% and at most approximately 10%.

Likewise, when at least one optical multiplexer/demultiplexer substitutes the first and second directional coupling portions 1, 2 with the multi-mode interferometer waveguides 5, 6, the aforementioned parameters regarding the power coupling ratios are to be set according to the present invention.

In the embodiments describes above, the core glass is a $TiO_2$ doped Silica-based glass. However, the core glass may be a $GeO_2$ doped Silica-based glass.

Also in the embodiments described above, the cross-sectional dimension of the core forming the first and second waveguides 3, 4 is 8.0 μm×8.0 μm, but may be appropriately selected. By forming the first and second waveguides 3, 4 using a single-mode waveguide based on wavelengths to be used and percentage difference of refractive indexes, the advantages described in the above embodiments can be realized.

Furthermore, in the embodiments described above, Silica-based quartz waveguide forming region is formed on a silicon substrate, but according to the present invention, a material and a method for such a formation may be appropriately selected. For example, an optical multiplexer/demultiplexer according to the present invention may be formed using semiconductor waveguides. Alternatively, an optical multiplexer/demultiplexer according to the present invention may be formed using optical waveguides having a refractive index distribution, such as Ti diffused $LiNbO_3$ waveguides and ion-exchange waveguides.

Still, according to the present invention, an optical multiplexer/demultiplexer may have various modifications based on a Mach-Zehnder Interferometer optical multiplexer/demultiplexer.

In yet another alternative, an optical multiplexer/demultiplexer according to the present invention may be utilized for an optical fiber type optical multiplexer/demultiplexer based on a Mach-Zehnder Interferometer circuit, rather than a plane optical waveguide circuit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical multiplexer/demultiplexer comprising:
    a first optical waveguide;
    a second optical waveguide;
    a first directional coupling portion in which the first and second optical waveguides are provided to transfer a light between the first and second optical waveguides;
    a second directional coupling portion in which the first and second optical waveguides are provided to transfer a light between the first and second optical waveguides, the first and second directional coupling portions are provided such that a length of the first optical waveguide between the first and second directional coupling portions and a length of the second optical waveguide between the first and second directional coupling portion have a difference (ΔL), wherein
    a product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5, the cross-propagation wavelength (λ2) being a wavelength of a cross-propagation light which propagates from the first optical waveguide to the second optical waveguide or from the second optical waveguide to the first optical waveguide, the through-propagation wavelength (λ1) being a wavelength of a through-propagation light which propagates from an input to an output of the first optical waveguide or from an input to an output of the second optical waveguide,
    power coupling ratio differences between first power coupling ratios of the first and second directional coupling portions with respect to the cross-propagation wavelength (λ2) and second power coupling ratios of the first and second directional coupling portions with respect to the through-propagation wavelength (λ1) are at least approximately 1% and at most approximately 10%, and
    third power coupling ratios of the first and second directional coupling portions with respect to an average wavelength of the cross-propagation wavelength (λ2) and the through-propagation wavelength (λ1) are at least approximately 45% and at most approximately 55%.

2. An optical multiplexer/demultiplexer according to claim 1, wherein the value (N') is at least substantially the integer (N)−0.1 and at most substantially the integer (N)+0.1.

3. An optical multiplexer/demultiplexer according to claim 1, wherein the value (N') is equal to the integer (N).

4. An optical multiplexer/demultiplexer according to claim 1, wherein a crosstalk is at most a predetermined value over a range in which the third power coupling ratios are at least approximately 45% and at most approximately 55%.

5. An optical multiplexer/demultiplexer according to claim 4, wherein the predetermined value of the crosstalk is −15 dB.

6. An optical multiplexer/demultiplexer according to claim 1, wherein the first power coupling ratio of the first directional coupling portion is substantially equal to the first power coupling ratio of the second directional coupling portion.

7. An optical multiplexer/demultiplexer according to claim 1, wherein the first power coupling ratio of the first directional coupling portion is different from the first power coupling ratio of the second directional coupling portion.

8. An optical multiplexer/demultiplexer according to claim 1, wherein the second power coupling ratio of the first directional coupling portion is substantially equal to the second power coupling ratio of the second directional coupling portion.

9. An optical multiplexer/demultiplexer according to claim 1, wherein the second power coupling ratio of the first directional coupling portion is different from the second power coupling ratio of the second directional coupling portion.

10. An optical multiplexer/demultiplexer according to claim 1, wherein the third power coupling ratio of the first directional coupling portion is substantially equal to the third power coupling ratio of the second directional coupling portion.

11. An optical multiplexer/demultiplexer according to claim 1, wherein the third power coupling ratio of the first directional coupling portion is different from the third power coupling ratio of the second directional coupling portion.

12. An optical multiplexer/demultiplexer comprising:
    a first optical waveguide;
    a second optical waveguide;
    a first multi-mode interferometer waveguide to which the first and second optical waveguides are connected;
    a second multi-mode interferometer waveguide to which the first and second optical waveguides are connected, the first and second multi-mode interferometer waveguides are provided such that a length of the first optical waveguide between the first and second multi-mode interferometer waveguides and a length of the second optical waveguide between the first and second multi-mode interferometer waveguides have a difference (ΔL), wherein a product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5, the cross-propagation wavelength (λ2) being a wavelength of a cross-propagation light which propagates from the first optical waveguide to the second optical waveguide or from the second optical waveguide to the first optical waveguide, the through-propagation wavelength (λ1) being a wavelength of a through-propagation light which propagates from an input to an output of the first optical waveguide or from an input to an output of the second optical waveguide, power coupling ratio differences between first power coupling ratios of the first and second multi-mode interferometer waveguides with respect to the cross-propagation wavelength (λ2) and second power coupling ratios of the first and second multi-mode interferometer waveguides with respect to the through-propagation wavelength (λ1) are at least approximately 1% and at most approximately 10%, and third power coupling ratios of the first and second multi-mode interferometer waveguides with respect to an average wavelength of the cross-propagation wavelength (λ2) and the through-propagation wavelength (λ1) are at least approximately 45% and at most approximately 55%.

13. An optical multiplexer/demultiplexer apparatus comprising:

a plurality of optical multiplexers/demultiplexers provided to repeat multiplexing or demultiplexing, each of the optical multiplexers/demultiplexers comprising:

a first optical waveguide;

a second optical waveguide;

a first directional coupling portion in which the first and the second optical waveguides are provided to transfer a light between the first and second optical waveguides;

a second directional coupling portion in which the first and the second optical waveguides are provided to transfer a light between the first and second optical waveguides, the first and second directional coupling portions are provided such that a length of the first optical waveguide between the first and second directional coupling portions and a length of the second optical waveguide between the first and second directional coupling portion have a difference (ΔL), wherein a product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5, the cross-propagation wavelength (λ2) being a wavelength of a cross-propagation light which propagates from the first optical waveguide to the second optical waveguide or from the second optical waveguide to the first optical waveguide, the through-propagation wavelength (λ1) being a wavelength of a through-propagation light which propagates from an input to an output of the first optical waveguide or from an input to an output of the second optical waveguide, power coupling ratio differences between first power coupling ratios of the first and second directional coupling portions with respect to the cross-propagation wavelength (λ2) and second power coupling ratios of the first and second directional coupling portions with respect to the through-propagation wavelength (λ1) are at least approximately 1% and at most approximately 10%, and third power coupling ratios of the first and second directional coupling portions with respect to an average wavelength of the cross-propagation wavelength (λ2) and the through-propagation wavelength (λ1) are at least approximately 45% and at most approximately 55%.

14. An optical multiplexer/demultiplexer apparatus comprising:

a plurality of optical multiplexers/demultiplexers provided to repeat multiplexing or demultiplexing, each of the optical multiplexers/demultiplexers comprising:

a first optical waveguide;

a second optical waveguide;

a first multi-mode interferometer waveguide to which the first and second optical waveguides are connected;

a second multi-mode interferometer waveguide to which the first and second optical waveguides are connected, the first and second multi-mode interferometer waveguides are provided such that a length of the first optical waveguide between the first and second multi-mode interferometer waveguides and a length of the second optical waveguide between the first and second multi-mode interferometer waveguides have a difference (ΔL), wherein a product (n×ΔL) between the difference (ΔL) and a refractive index (n) of the first and second optical waveguides approximates a product between a cross-propagation wavelength (λ2) and a value (N') substantially equal to an integer (N), and a product between a through-propagation wavelength (λ1) and the value (N')±0.5, the cross-propagation wavelength (λ2) being a wavelength of a cross-propagation light which propagates from the first optical waveguide to the second optical waveguide or from the second optical waveguide to the first optical waveguide, the through-propagation wavelength (λ1) being a wavelength of a through-propagation light which propagates from an input to an output of the first optical waveguide or from an input to an output of the second optical waveguide, power coupling ratio differences between first power coupling ratios of the first and second multi-mode interferometer waveguides with respect to the cross-propagation wavelength (λ2) and second power coupling ratios of the first and second multi-mode interferometer waveguides with respect to the through-propagation wavelength (λ1) are at least approximately 1% and at most approximately 10%, and third power coupling ratios of the first and second multi-mode interferometer waveguides with respect to an average wavelength of the cross-propagation wavelength (λ2) and the through-propagation wavelength (λ1) are at least approximately 45% and at most approximately 55%.

15. An optical multiplexer/demultiplexer comprising:

a first optical waveguide;

a second optical waveguide;

a directional coupling portion in which the first and the second optical waveguides are provided to transfer a light between the first and second optical waveguides;

a multi-mode interferometer waveguide to which the first and second optical waveguides are connected, the directional coupling portion and the multi-mode interferometer waveguide are provided such that a length of the first optical waveguide between the directional coupling portion and the multi-mode interferometer waveguide and a length of the second optical waveguide between the directional coupling portion and the multi-mode interferometer waveguide have a difference ($\Delta L$), wherein a product (n×$\Delta L$) between the difference ($\Delta L$) and a refractive index (n) of the first and second optical waveguides approximates a product between a cross-propagation wavelength ($\lambda 2$) and a value (N') substantially equal to an integer (N), and a product between a through-propagation wavelength ($\lambda 1$) and the value (N')±0.5, the cross-propagation wavelength ($\lambda 2$) being a wavelength of a cross-propagation light which propagates from the first optical waveguide to the second optical waveguide or from the second optical waveguide to the first optical waveguide, the through-propagation wavelength ($\lambda 1$) being a wavelength of a through-propagation light which propagates from an input to an output of the first optical waveguide or from an input to an output of the second optical waveguide, power coupling ratio differences between first power coupling ratios of the directional coupling portion and the multi-mode interferometer waveguide with respect to the cross-propagation wavelength ($\lambda 2$) and second power coupling ratios of the directional coupling portion and the multi-mode interferometer waveguide with respect to the through-propagation wavelength ($\lambda 1$) are at least approximately 1% and at most approximately 10%, and third power coupling ratios of the directional coupling portion and the multi-mode interferometer waveguide with respect to an average wavelength of the cross-propagation wavelength ($\lambda 2$) and the through-propagation wavelength ($\lambda 1$) are at least approximately 45% and at most approximately 55%.

16. An optical multiplexer/demultiplexer comprising:

a first optical waveguide;

a second optical waveguide;

first directional coupling means for coupling the first and second optical waveguides to transfer a light between the first and second optical waveguides;

second directional coupling means for coupling the first and second optical waveguides to transfer a light between the first and second optical waveguides, the first and second directional coupling means are provided such that a length of the first optical waveguide between the first and second directional coupling means and a length of the second optical waveguide between the first and second directional coupling means have a difference ($\Delta L$), wherein a product (n×$\Delta L$) between the difference ($\Delta L$) and a refractive index (n) of the first and second optical waveguides approximates a product between a cross-propagation wavelength ($\lambda 2$) and a value (N') substantially equal to an integer (N), and a product between a through-propagation wavelength ($\lambda 1$) and the value (N')±0.5, the cross-propagation wavelength ($\lambda 2$) being a wavelength of a cross-propagation light which propagates from the first optical waveguide to the second optical waveguide or from the second optical waveguide to the first optical waveguide, the through-propagation wavelength ($\lambda 1$) being a wavelength of a through-propagation light which propagates from an input to an output of the first optical waveguide or from an input to an output of the second optical waveguide, power coupling ratio differences between first power coupling ratios of the first and second directional coupling means with respect to the cross-propagation wavelength ($\lambda 2$) and second power coupling ratios of the first and second directional coupling means with respect to the through-propagation wavelength ($\lambda 1$) are at least approximately 1% and at most approximately 10%, and third power coupling ratios of the first and second directional coupling means with respect to an average wavelength of the cross-propagation wavelength ($\lambda 2$) and the through-propagation wavelength ($\lambda 1$) are at least approximately 45% and at most approximately 55%.

* * * * *